United States Patent [19]
Yamamoto et al.

[11] Patent Number: 5,764,613
[45] Date of Patent: Jun. 9, 1998

[54] OPTICAL PICKUP APPARATUS

[75] Inventors: Kenji Yamamoto, Saitama; Isao Ichimura, Kanagawa; Fumisada Maeda, Tokyo; Toshio Watanabe, Kanagawa; Kiyoshi Ohsato, Chiba, all of Japan

[73] Assignee: Sony Corporation, Tokyo, Japan

[21] Appl. No.: 640,209

[22] Filed: Apr. 30, 1996

[30] Foreign Application Priority Data

May 18, 1995 [JP] Japan ................... 7-119947

[51] Int. Cl.$^6$ ................................ G11B 7/09
[52] U.S. Cl. .................. 369/112; 369/44.14; 369/43; 369/44.23; 359/664
[58] Field of Search ................. 369/44.14, 44.23, 369/112, 43; 359/664

[56] References Cited

U.S. PATENT DOCUMENTS

| | | | |
|---|---|---|---|
| 5,004,307 | 4/1991 | Kino et al. | 359/356 |
| 5,121,256 | 6/1992 | Corle et al. | 359/664 |
| 5,125,750 | 6/1992 | Corle et al. | 359/819 |
| 5,497,359 | 3/1996 | Mamin et al. | 369/44.15 |
| 5,553,052 | 9/1996 | Oono et al. | 369/112 |

*Primary Examiner*—David C. Nelms
*Assistant Examiner*—Kim-Kwok Chu
*Attorney, Agent, or Firm*—Ronald P. Kananen

[57] ABSTRACT

An optical pickup apparatus is constructed of an objective lens for condensing a light beam emitted from a light source toward an optical recording medium, and a convex lens arranged between the optical recording medium and the objective lens in which a surface thereof upon which the luminous flux projected from the objective lens is incident is a convex spherical surface with a radius of curvature which is a predetermined value, and another surface thereof which is located near and opposite to a surface portion of the optical recording medium which is a plane. With this arrangement, a tolerance with respect to decentering of the convex lens in connection with the optical axis of the objective lens is increased, so that an occurrence of aberration is reduced.

11 Claims, 23 Drawing Sheets

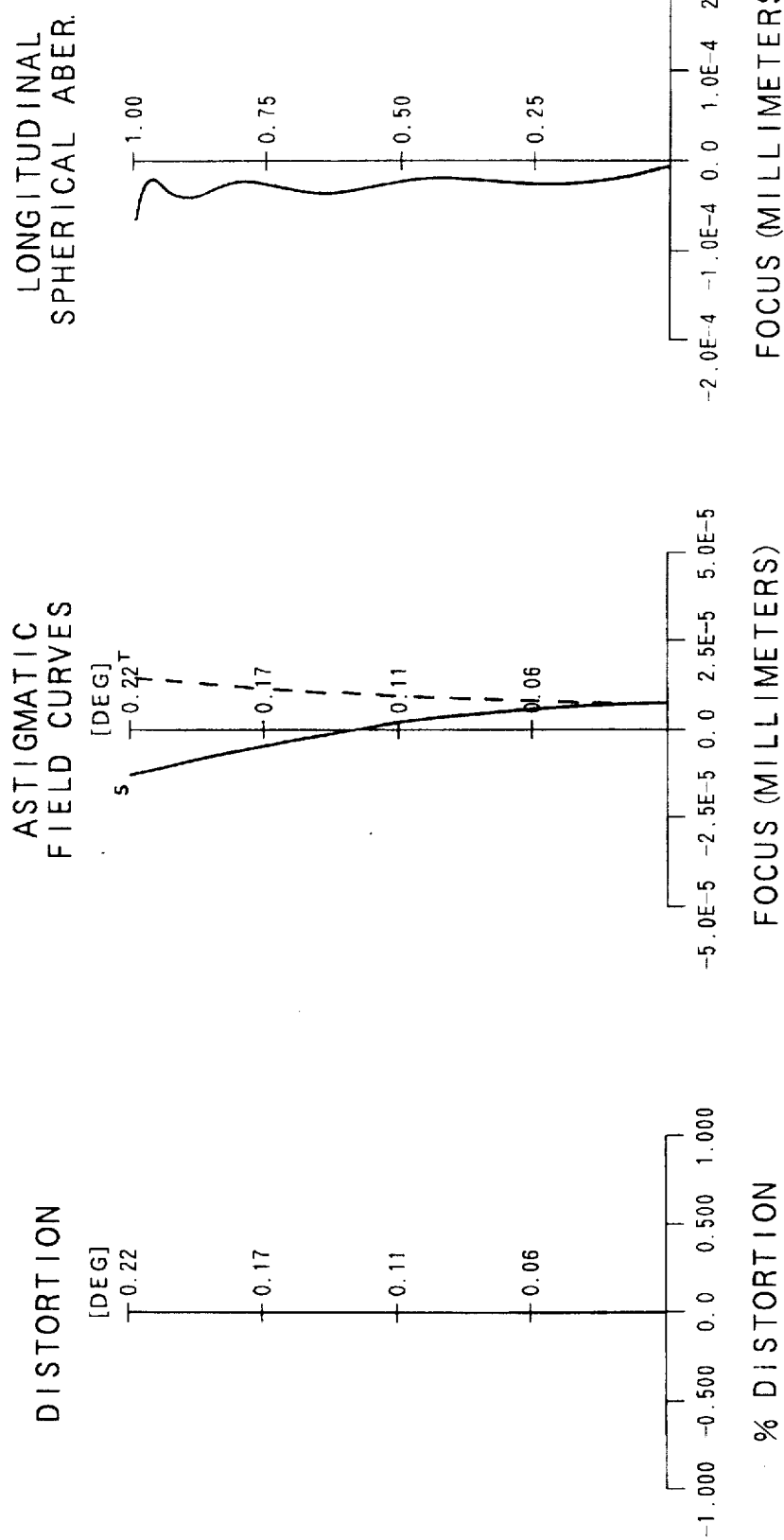

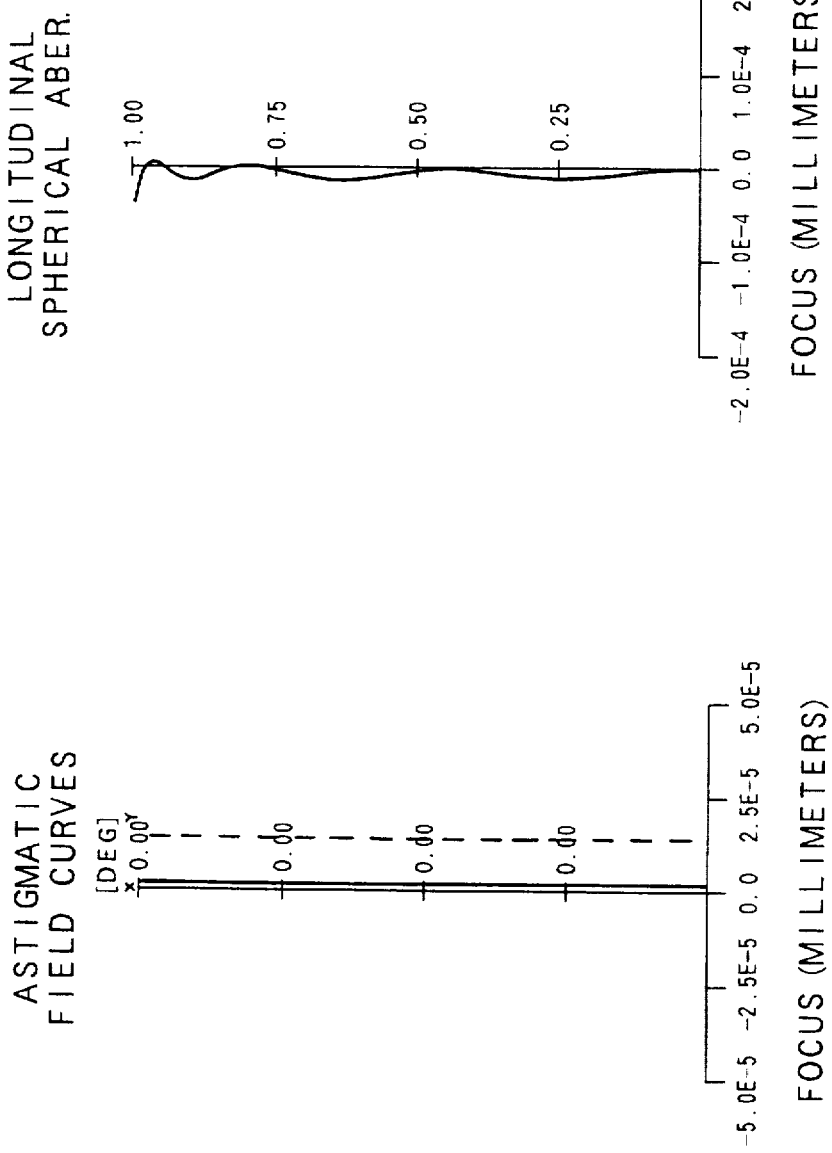

OPTICAL PICKUP APPARATUS

BACKGROUND OF THE INVENTION

1. Field of the Invention

The present invention relates to an optical pickup apparatus used to condense light emitted from a light source onto an optical recording medium such as a so-called "optical memory disk", an optical memory card, and an optical memory tape.

2. Prior Art

Conventionally, various types of optical recording mediums such as a so-called "optical memory disk", an optical memory card, or an optical memory tape have been proposed as recording mediums of information signals. Then, optical pickup apparatuses have been proposed which condense the light emitted from the light source onto this optical recording medium so as to read/write the information signal with respect to this optical recording medium.

In an optical pickup apparatus, a numerical aperture (N.A.) of an objective lens for condensing light emitted from a light source onto an optical recording medium is made large, so that a diameter of a beam spot formed when a light is condensed onto this optical recording medium can be made small, and thus the information-recording density of this optical recording medium can be improved.

As the means for increasing the numerical aperture of the objective lens, various ideas have been proposed in, for instance, U.S. Pat. No. 5,004,307, U.S. Pat. No. 5,121,256, and U.S. Pat. No. 5,125,750, in which the convex lens having a substantially hemispherical shape is arranged between this objective lens and the optical recording medium. In this proposed idea, since the numerical aperture of such an optical system for combining this convex lens with the objective lens is larger than that of this objective lens itself, the diameter of the beam spot can be reduced without varying the numerical aperture of this objective lens.

The above-described convex lens is a so-called "solid immersion lens (SIL)" whose surface is a convex spherical surface upon which luminous flux projected from an objective lens is incident, and whose surface located opposite to an optical recording medium is a plane.

The plane of the convex lens, which is located opposite to the optical recording medium, is positioned very close to a the signal recording surface of the optical recording medium. Then, the luminous flux projected from the objective lens is incident upon the convex spherical surface of this convex lens along a vertical direction. In other words, the luminous flux projected from the object lens is the condensed luminous flux, and also the luminous flux condensed toward the curvature center of the convex spherical surface.

The numerical aperture defined by combining the objective lens with the convex lens is equal to such a value obtained by multiplying the numerical aperture of the objective lens by the reflection index of the convex lens.

In the optical pickup apparatus having the above-explained convex lens, since the numerical aperture defined by combining this convex lens with the objective lens is larger, the tolerance values with respect to the off-axis incidence for this objective lens (incidence on the objective lens in a direction unparallel with the optical axis of the objective lens), the objective skew with respect to the optical axis, and the decentering of the convex lens with respect to the optical axis are extremely small under such a condition that the occurrence of aberration is suppressed less than a predetermined value.

In such an optical system as a microscope, where the respective lenses can be fixed with respect to the lens-barrel, the respective lenses can be positioned with high precision. However, in an optical pickup apparatus, since an objective lens and a convex lens must be transported at high speed while following the optical recording medium, it is rather difficult to continuously maintain the highly positioning precision of the respective lenses.

That is, in case that a so-called "focus servo" is actuated, both the objective lens and the convex lens are transported along the optical axis direction so as to maintain the on-focus condition on the optical recording medium. In this operation there is a risk that the objective lens and convex lens are inclined by approximately 0.2° with respect to the optical axis.

Also, there is another risk that the objective lens is inclined by approximately 0.2° with respect to the optical axis when the objective lens is mounted on the lens-barrel. Furthermore, there is a risk that the convex lens produces a decentering amount of approximately 30 μm with respect to the optical axis during operations of the optical pickup apparatus.

In addition, the interval (space) between the plane of the convex lens and the optical recording medium may be preferably made wider in order to avoid dust on the optical recording medium that collides with the convex lens, and also to keep this interval constant. However, when this interval is widened, the aberration amount caused by the above-described gradient of the objective lens with respect to the optical axis will be increased.

As a consequence, in the above-explained conventional optical pickup apparatus, it is practically difficult to maintain the positional precision of the respective lenses, so the occurrence of aberration can't be sufficiently suppressed. If the occurrence of aberration can't be sufficiently suppressed, then information signals can't be correctly read out from the optical recording medium.

OBJECT AND SUMMARY OF THE INVENTION

Therefore, the present invention has an object to provide an optical pickup apparatus having a convex lens (solid immersion lens) arranged between an objective lens and an optical recording medium, in which tolerance degrees as to the off-axis incidence, the objective skew relative to an optical axis, and also a decentering amount of this convex lens relative to the optical axis are increased, and the occurrence of aberration can be sufficiently suppressed without the positional precision of the respective lenses.

To solve the above-described problems and to achieve the above-mentioned object, an optical pickup apparatus according to a first embodiment is an optical pickup apparatus for condensing light emitted from a light source onto a signal recording surface of an optical recording medium, comprising: an objective lens for condensing the light beam emitted from the light source toward an optical recording medium to project the condensed light beam therefrom; and a convex lens arranged between the optical recording medium and the objective lens, in which a surface thereof upon which the luminous flux projected from the objective lens is incident is a convex spherical surface whose radius of curvature is a predetermined value, and another surface thereof, which is located near and opposite to a surface portion of the optical recording medium, is a plane. Under such a condition that the light beam passed through the convex lens is condensed to the signal recording surface, assuming now that such a thickness of the objective lens is a reference thickness when the luminous flux projected from the objective is incident upon the convex spherical surface along a vertical direction, a thickness of the objective lens is made thicker than this reference thickness.

According to a second embodiment of the above-described optical pickup apparatus, the increase in the thickness of the convex lens with respect to the reference thickness is selected to be 20% to 50% of a radius of curvature of a convex spherical surface.

In the optical pickup apparatus according to the present invention, the convex lens is positioned between the optical recording medium and the objective lens. The surface of this convex lens, upon which the luminous flux projected from the objective lens is incident, is made of the convex spherical surface whose radius of curvature is a predetermined value, whereas the surface of this convex lens, which is located near and opposite to the surface portion of the optical recording medium, is made of the plane. Since the thickness of the convex lens is made thicker than the reference thickness by such an increasing amount lower than, or equal to 60% of the radius of curvature of this convex spherical surface, the tolerance degrees as to the off-axis incidence, the objective skew with respect to the optical axis, and also the decentering amount of the convex lens with respect to the optical axis can be increased, and therefore the occurrence of aberration can be suppressed. The reference thickness is defined in such a manner that when the luminous flux projected from the objective is incident upon this convex spherical surface along the vertical direction, the light passed through this convex lens is condensed onto the signal recording surface of this optical recording medium.

Also, if the thickness increasing amount of the convex lens with respect to the reference thickness is selected to be 20% to 50% of the radius of curvature of the convex spherical surface, then it is possible to suppress such aberration caused by combining the off-axis incidence, the objective skew relative to the optical axis, and also the decentering amount of the convex lens relative to the optical axis.

BRIEF DESCRIPTION OF THE DRAWINGS

These and other objects, features and advantages of the present invention will become more apparent from the following detailed description when read in conjunction with the accompanying drawings.

FIG. 15 is a graph showing an amount of distortion aberration caused by the off-axis incidence in the optical pickup apparatus;

FIG. 16 is a graph showing an amount of astigmatic aberration caused by the off-axis incidence in the optical pickup apparatus;

FIG. 17 is a graph showing an amount of spherical aberration caused by the off-axis incidence in the optical pickup apparatus;

FIG. 28 is a graph indicating an amount of astigmatic aberration caused by the decentering of the convex lens (solid immersion lens) with respect to the optical axis in the optical pickup apparatus;

FIG. 29 is a graph indicating an amount of spherical aberration caused by the decentering of the convex lens (solid immersion lens) with respect to the optical axis in the optical pickup apparatus;

DETAILED DESCRIPTION OF THE PREFERRED EMBODIMENTS

Referring to drawings, a description will be made of optical pickup apparatuses according to various embodiments of the present invention.

Figure 4:
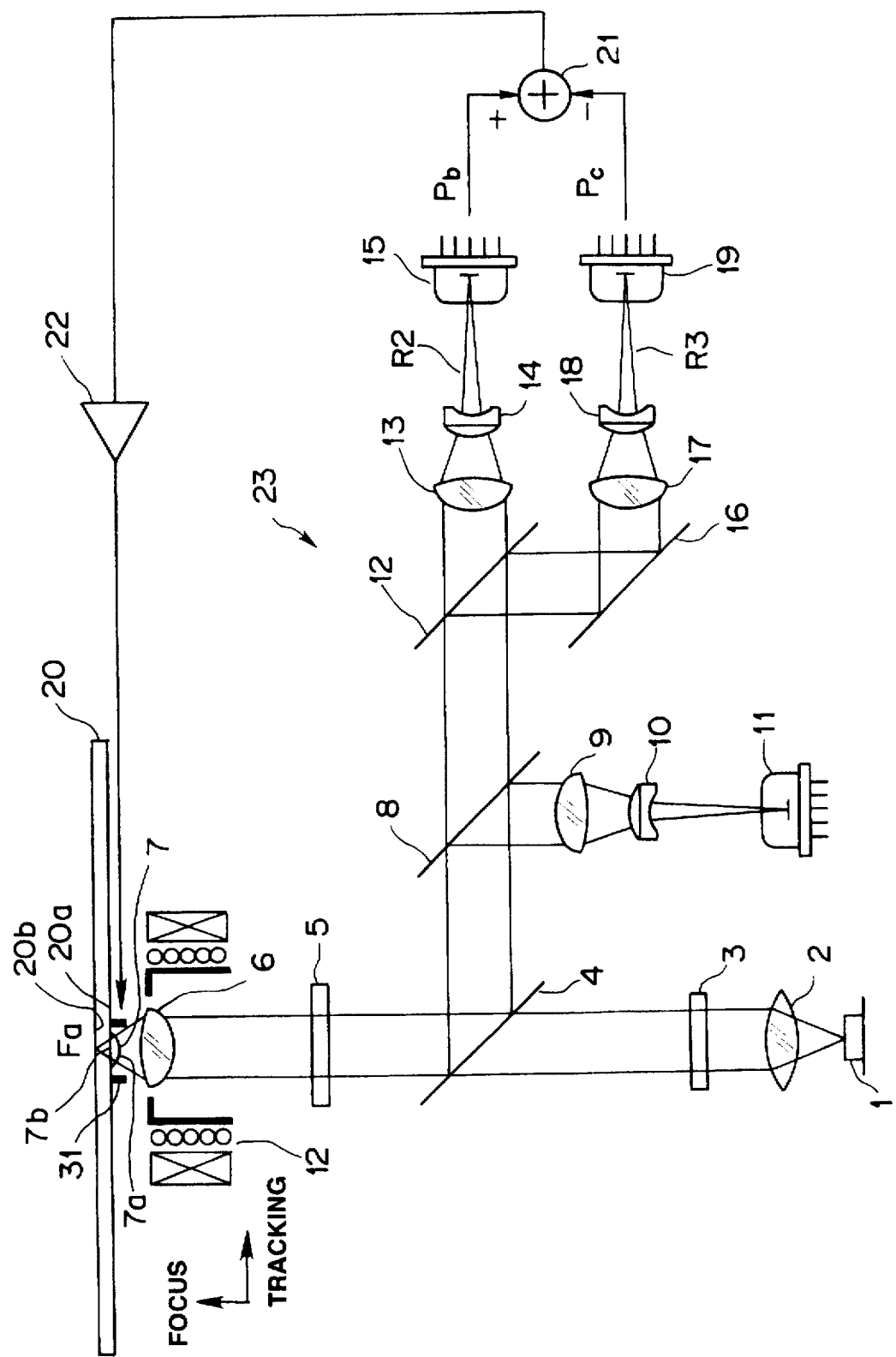
FIG. 4 is a side view schematically showing an overall arrangement of the optical pickup apparatus.

As indicated in FIG. 4, an optical pickup apparatus according to the present invention corresponds to such an optical pickup apparatus for condensing light emitted from a light source 1 onto a signal recording surface 20b of an optical recording medium 20 such as an optical disk (optical disk memory).

Figure 1:
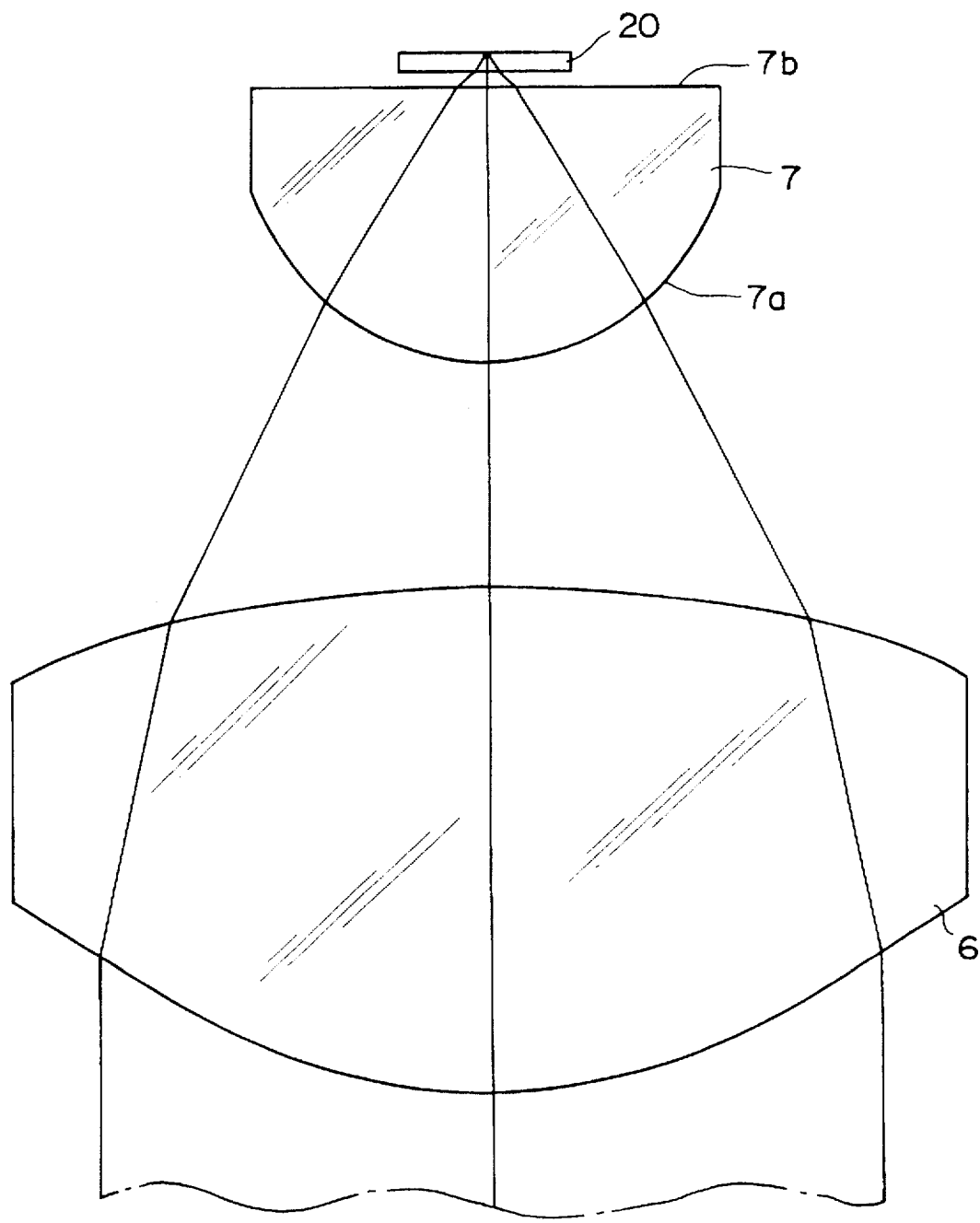
FIG. 1 is a side view showing a structure of a major portion of an optical pickup apparatus according to the present invention.
Figure 3:
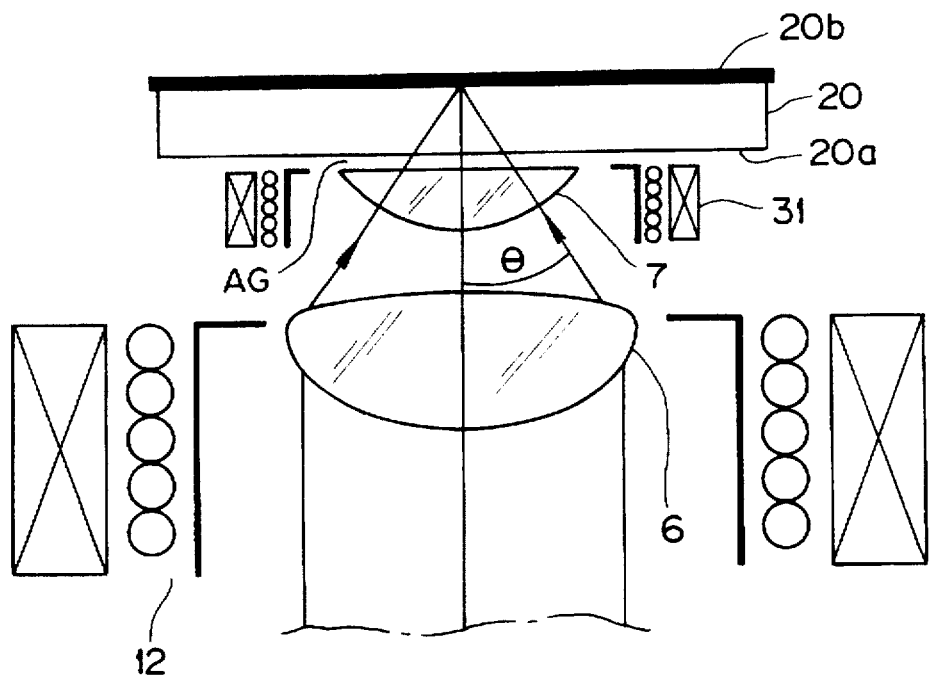
FIG. 3 is a side view schematically indicating an objective lens drive mechanism of the optical pickup apparatus.

As illustrated in FIG. 1 and FIG. 3, in the optical recording medium 20, a parallel/plain transparent layer 20c is made between a light incident surface 20a constituting a surface portion and a signal recording surface 20b. This transparent layer constitutes, for instance, a portion of a disk substrate, and has a thickness of 0.1 mm to 0.2 mm. The luminous flux incident om the light incident surface 20a from the optical pickup apparatus penetrates through the transparent layer 20c and then is condensed onto the signal recording surface 20b.

As a light source 1, for example, a semiconductor laser is utilized. The luminous flux emitted from this optical source 1 is made as parallel luminance flux by a collimator lens 2, which will then be diffracted by a diffraction grating 3. Thereafter, the diffracted luminous flux is passed through a polarization beam splitter 4 and λ/4 (a quarter wavelength) plate 5 and then is incident on an objective lens 6 as a circular-polarization parallel luminous flux.

As shown in FIG. 1, the objective lens 6 projects the luminous flux incident thereon toward the optical recording medium 20 as a condensed luminous flux.

Then, in this optical pickup apparatus, a convex lens (solid immersion lens, abbreviated as "SIL") 7 is positioned between the optical recording medium 20 and the objective lens 6.

Figure 2:
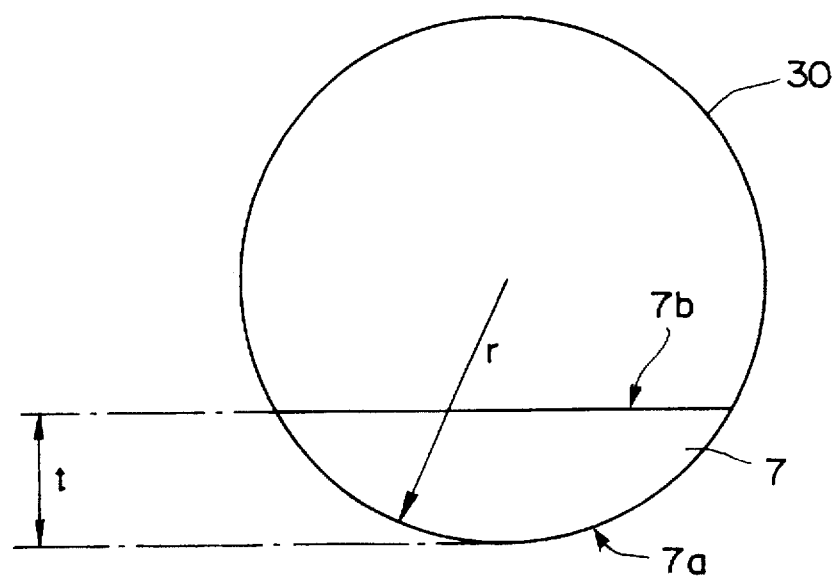
FIG. 2 is a side view representing a structure of a convex lens (solid immersion lens) of the optical pickup apparatus.

As illustrated in FIG. 1 and FIG. 2, the convex lens 7 is constructed in such a manner that a surface upon which the luminous flux projected from the objective lens 6 constitutes a convex spherical surface 7a whose radius of curvature is a predetermined value "r", and a surface corresponding to the surface portion of the optical recording medium 20, and located close and opposite to the light incident surface 20a thereof is a plane 7b.

Also, as shown in FIG. 3 and FIG. 4, the convex lens 7 is transported by a convex lens drive mechanism (actuator) 31 in such a manner that the interval between the plane 7b and the light incident surface 20a continuously becomes a constant very small space. That is, a thin air layer (air gap) AG is formed between the planar surface 7b and the light incident surface 20a.

Also, as represented in FIG. 3 and FIG. 4, the objective 6 is transported by the objective drive mechanism (actuator) 12 along an optical axis direction (focus direction) and another direction (tracking direction) perpendicular to both this optical axis and a recording track in such a manner that a beam spot formed by the luminous flux through the convex lens 7 is continuously formed on the recording track over the signal recording surface 20b. In other words, the luminous flux which has passed through the convex lens 7 is continuously condensed on the recording track formed over the signal recording surface 20b.

Both the convex lens drive mechanism 31 and the objective drive mechanism 12 are operated in response to a detection signal (error signal) produced from reflected light received from the signal recording surface 20b.

In other words, the luminous flux which has passed through the convex lens 7 and is then condensed onto the signal recording surface 20b penetrates through the convex lens 7 and the objective lens 6 as the reflected luminous flux reflected by the signal recording surface 20b to the λ/4 plate 5. This reflected luminous flux is converted by the λ/4 plate 5 into a linear-polarized luminous flux along a direction perpendicular to the polarization direction of the luminous flux emitted from the light source 1. This reflected luminous flux is reflected by the polarization beam splitter 4 to a first half mirror 8.

A portion of the reflected luminous flux incident upon the first half mirror 8 is condensed via a condensing lens 9 and a multi lens 10 onto a light receiving surface of a first photodetector 11 composed of a photodiode or the like. The multi lens 10 is a lens composed of a cylindrical lens and a concave lens in an integral form. This multi lens 10 produces astigmatic aberration in the incident luminous flux, and also condenses the reflected luminous flux onto the light receiving surface of the first photodetector 11.

The first photodetector 11 has a light receiving surface which is subdivided into plural portions (for instance, 6 subdivided surface portions), and produces an RF signal corresponding to the read signal from the optical recording medium 20, and also various error signals such as a focus error signal and a tracking error signal by performing the calculation based upon the photodetected signals from these subdivided light receiving surfaces.

In response to the focus error signal, the objective drive mechanism 12 transports the objective lens 6 along the above-explained focus direction in order to maintain the focused condition of the luminous flux on the signal recording surface 20b.

Also, in response to the tracking error signal, the objective drive mechanism 12 transports the objective lens 6 along the tracking direction in order that the luminous flux passed through the convex lens is irradiated onto the recording track on the signal recording surface 20b.

The reflected luminous flux which has passed through the first half mirror 8 is incident upon a second half mirror 12. This second half mirror 12 subdivides the incident reflected luminous flux into a half of the reflected thereof, and conducts one half luminous flux "R2" via a condense lens 13 and a multi lens 14 to a second photodetector 15, and also conducts the other half of the reflection luminous flux "R3" via a mirror 16, a condense lens 17, and a multi lens 18 to a third photodetector 19.

The second photodetector 15 detects the reflection luminous flux from the light incident surface 20a by adjusting the position of the incident reflected luminous flux along the optical axis direction. Also, the third photodetector 19 may detect the reflected luminous flux from the plane 7b by adjusting the position of the incident reflected flux along the optical axis direction.

Photodetection outputs "Pb" and "Pc" derived from the second photodetector 15 and the third photodetector 19 are subtracted from each other by a subtracter 21. The output from this subtracter 21 is supplied to an actuator driver 22.

This actuator driver 22 drives the convex lens drive mechanism 31 in response to the output from the subtracter 21, so that the thickness of the air gap (AG) between the plane 7b and the light incident surface 20a can be kept constant.

In this optical pickup apparatus, the thickness of the convex lens 7 is made thicker than a reference thickness "$t_0$", assuming that under such a condition that the light which has passed through this convex lens 7 is condensed onto the signal recording surface 20a, the luminous flux projected from the objective 6 is incident on the convex spherical surface 7a along the vertical direction, and then the reference thickness "$t_0$" is defined under the above-described state.

It should be noted that the condition under which the luminous flux projected from the objective 6 is incident upon the convex spherical surface 7a along the vertical direction corresponds to such a condition that this luminous flux is directed to a curvature center of the convex spherical surface 7a so as to be condensed, namely such a state that this luminous flux is not refracted on the convex spherical surface 7a.

In other words, the convex lens 7 is so formed under such a condition that the plane 7b has been shifted to such a side apart from the convex spherical surface 7a, rather than the condition that the thickness is the reference thickness "$t_0$". As a consequence, when the luminous flux passed through the convex lens 7 is being condensed onto the signal recording surface 20b, the luminous flux incident upon the convex spherical surface 7a of this convex lens 7 is refracted along the condensing direction of the optical axis.

Preferably, a thickness increasing amount of the convex lens 7 is smaller than, or equal to 60% of the radius of curvature of the convex spherical surface 7a.

In this optical pickup apparatus, the tolerance degree as to the off-axis incidence, the objecive skew of the object lens 6 with respect to the optical axis, and the decentering of this convex lens 7 with respect to the optical axis are increased, so that occurrences of the aberration can be suppressed.

Now, a comparison is made in such a case that the thickness of the convex lens 7 is selected to be the reference thickness "$t_0$" as to the optical pickup apparatus having lens data indicated in a table 1 and a table 2.

TABLE 1

| | RDY (Radius of Curvature) | Thickness | CLA (Name of Glass) |
|---|---|---|---|
| OBJ: | INFINITY | INFINITY | |
| STO: | 2.81940 | 2.600000 | FCD1_HOYA |
| | A:−0.235476 × 10$^{-2}$ | B:−0.655445 × 10$^{-3}$ | C:−0.682554 × 10$^{-4}$ |
| 2: | −6.57878 | 1.163402 | |
| | A:0.139038 × 10$^{-1}$ | B:−0.581075 × 10$^{-2}$ | C:0.970059 × 10$^{-3}$ |
| 3: | 1.25000 | 1.400000 | BK7_SCHOTT |
| 4: | INFINITY | 0.075000 | |
| 5: | INFINITY | 0.100000 | 'PC' |
| IMG: | INFINITY | 0.000000 | |

TABLE 2

| EPD (Incident Pupil Diameter) | 3.95710 |
|---|---|
| WL (Wavelength(nm)) | 680.00 |
| REFRACTIVE INDICES (Refractive Index) | |
| GLASS CODE | 680.00 |
| BK7_SCHOTT | 1.513615 |
| FCD1_HOYA | 1.494611 |
| 'PC' | 1.576900 |
| EFL (Entire-diameter Focal Length) | 2.473 |

In the table 1, symbol "OBJ" indicates an infinite object point, and a second plane corresponds to the objective lens 6 according to STO.

Symbols A, B, and C of STO indicate fourth, sixth, and eighth aspherical surface coefficients. It should be noted that a tenth aspherical surface coefficient "D" of this STO is −0.123316×10$^{-4}$. Symbols A, B, C of the second plane indicate fourth, sixth, and eighth aspherical surface coefficients. It should be also noted that a tenth aspherical surface coefficient "D" of this second surface is −0.677027×10$^{-4}$.

Then, the fourth plane rather than the third plane corresponds to the convex lens 7. Also, the fifth plane corresponds to the light incident surface 20a, whereas symbol IMG corresponds to the signal recording surface 20b.

Accordingly, in this optical pickup apparatus, the thickness of the convex lens 7 is 1.4 mm, the radius curvature of the convex spherical surface 7a is 1.25 mm, the interval (AG) between the plane 7b and the light incident surface 20a is 75 µm, and the thickness of the transparent layer 20c is 0.1 mm. It should be noted that when the thickness of the transparent layer 20c is varied, it can be offset by changing the thickness of the convex lens 7 by the layer thickness variation in the reverse direction.

As shown in the table 2, an incident pupil diameter (EPD), a wavelength (WL) of luminous flux, and an entire diameter focal length (EFL) of an entire system are 3.95710 mm, 680.00 nm, and 2.473 mm, respectively. The refractive indexes of the respective glass materials are indicated in the table 2: BK7 (convex lens 7) is 1.513615; FCD1 (objective lens 6) is 1.494611; and PC (polycarbonate) (transparent layer of optical recording medium 20) is 1.576900.

Since the reference thickness "$t_0$" of the convex lens 7 is 0.995 mm, thickness increasing amount of the convex lens 7 employed in this optical pickup apparatus with respect to the reference thickness "$t_0$" is equal to 32.4% of the radius of curvature "r". It should be noted that the numeral aperture (N. A) is equal to 0.8.

In this optical pickup apparatus, the wavefront aberration as to the off-axis incidence (0.3°), the objective skew of the objective lens 6 with respect to the optical axis (0.5°), and the decentering of the convex lens 7 with respect to the optical axis (30 µm) are given as follows, as shown in the table 3, 0.0226 rms ($\lambda$), 0.030 rms ($\lambda$), and 0.010 rms ($\lambda$).

TABLE 3

| Cases | Wavefront aberration rms ($\lambda$) |
|---|---|
| 1) Off axis (0.3°) | 0.026 |
| 2) Object skew relative to optical axis (0.5°) | 0.030 |
| 3) Dicentering of SIL relative to optical axis (30 µm) | 0.010 |

Then, when the thickness of the convex lens 7 is selected to be the reference thickness "$t_0$" (0.995 mm), the wavefront aberration as to the off-axis incidence (0.3°), the objective skew of the objective lens 6 with respect to the optical axis (0.5°), and the decentering of the convex lens 7 with respect to the optical axis (30 µm) are given, as shown in a table 4, as 0.050 rms ($\lambda$), 0.049 rms ($\lambda$), and 0.050 rms ($\lambda$), respectively.

TABLE 4

| Cases | Wave front aberration rms (µ) |
|---|---|
| 1) Off axis (0.3°) | 0.050 |
| 2) Object skew relative to optical axis (0.5°) | 0.049 |
| 3) Dicentering of SIL relative to optical axis (30 µm) | 0.050 |

As a consequence, it can be seen that the occurrence of aberration is suppressed in this optical pickup apparatus. That is, where the amount of aberration is suppressed lower than a predetermined value in this optical pickup apparatus, as to the off-axis incidence, the objective skew of the objective lens 6 with respect to the optical axis, the decentering of the convex lens 7 with respect to the optical axis, precision in the mounting positions and also precision in maintaining of the positions may be eased.

Figure 5:
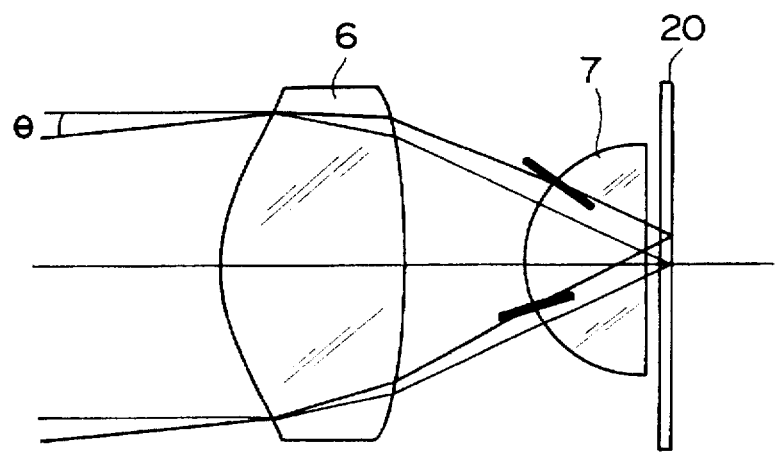
FIG. 5 is a side view indicating a state of off-axis incidence occurred in the optical pickup apparatus.
Figure 6:
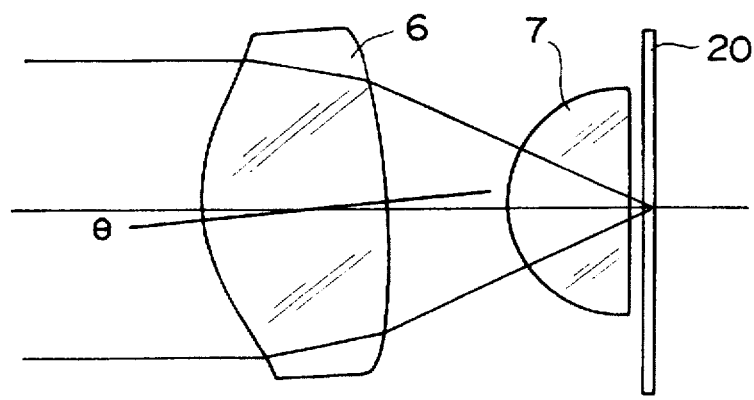
FIG. 6 is a side view indicating an objective skew with respect to the optical axis, occurred in the optical pickup apparatus.
Figure 7:
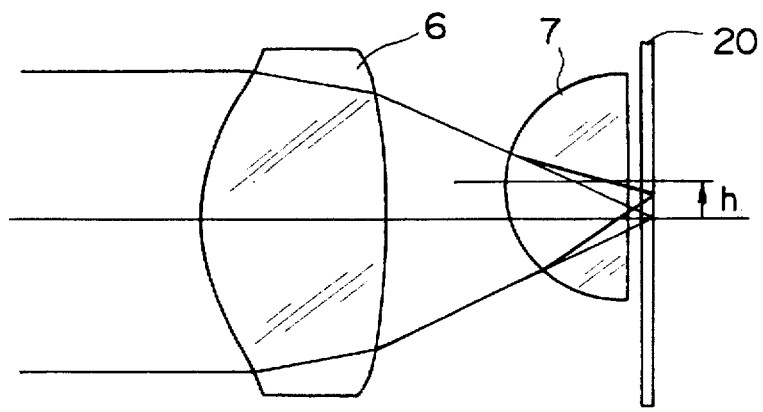
FIG. 7 is a side view indicating decentering of the convex lens (solid immersion lens) with respect to the optical axis, occurred in the optical pickup apparatus.

It should be noted that as indicated by "θ" in FIG. 5, the off-axis incidence corresponds to such a condition that the luminous flux incident upon the objective lens 6 is inclined with respect to the optical axis. Also, as indicated by "θ" in FIG. 6, the objective skew of the objective lens 6 with respect to the optical axis corresponds to such a condition that only this objective 6 is inclined with respect to the optical axis. Then, as illustrated by "h" in FIG. 7, the decentering of the convex lens 7 with respect to the optical axis corresponds to such a condition that only this objective 7 is decentered with respect to the optical axis.

Figure 9:
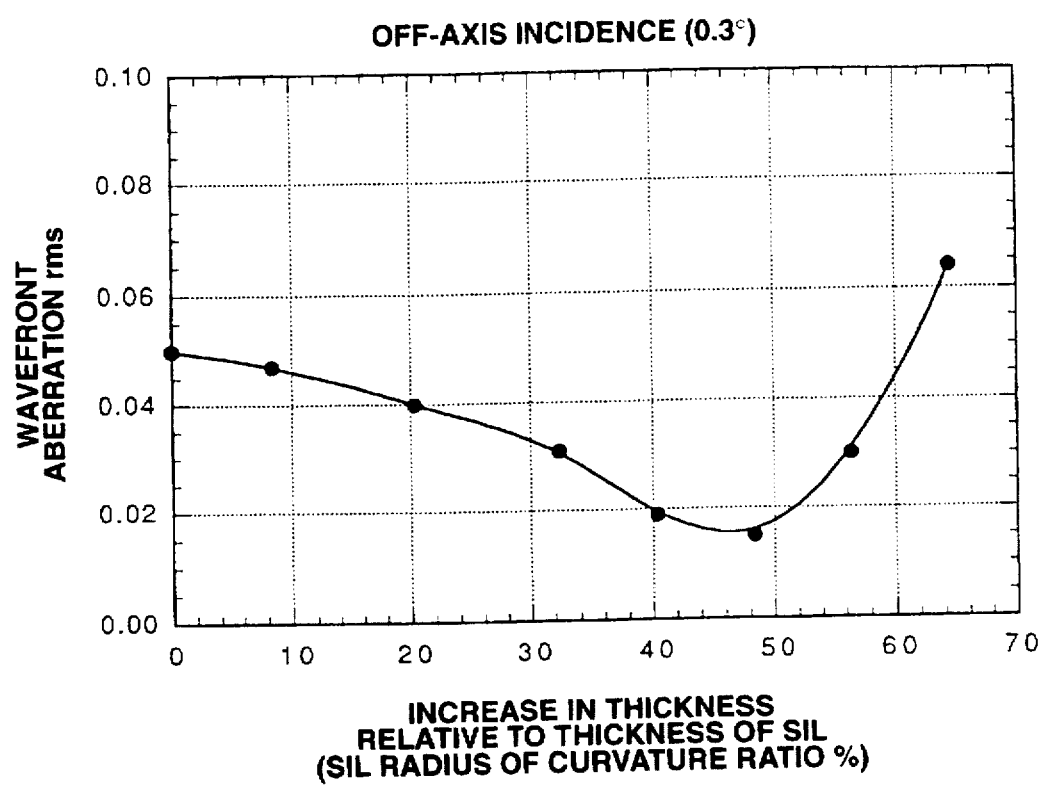
FIG. 9 is a graph showing an amount of wavefront aberration caused by the off-axis incidence (0.3°) in comparison with the increase in the thickness of the convex lens (solid immersion lens) in the optical pickup apparatus.

Subsequently, as for the off-axis incidence (0.3°), a change in the wavefront aberration (rms ($\lambda$)) when the thickness of the convex lens 7 is made thicker than the reference thickness "$t_0$" is improved, as represented in FIG. 9, as compared with such a case that the thickness of this convex lens 7 is equal to the reference thickness "$t_0$" in such a range that the thickness increasing amount is smaller than, or equal to 60% of the above-explained radius of curvature "r".

Figure 10:
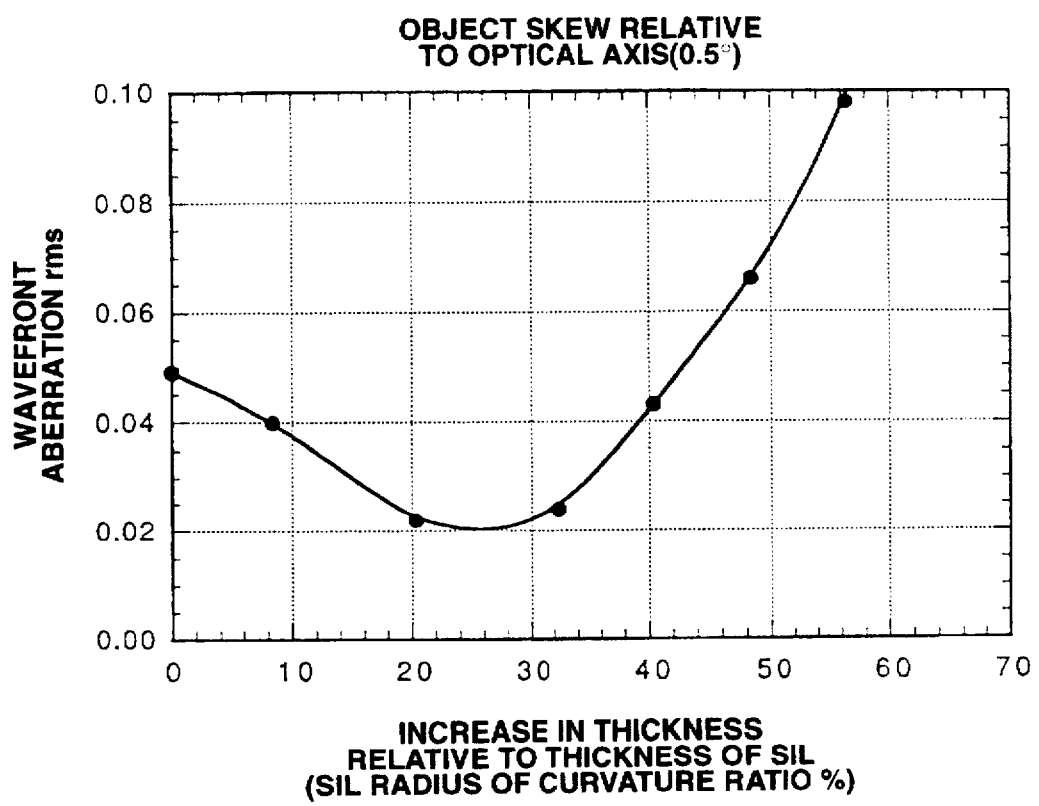
FIG. 10 is a graph showing an amount of wavefront aberration caused by the objective skew (0.5°) with respect to the optical axis in comparison with the thickness increase of the convex lens (solid immersion lens) in the optical pickup apparatus.

Next, as for the objective skew of the objective lens 6 with respect to the optical axis (0.5°), a change in the wavefront aberration (rms ($\lambda$)) when the thickness of the convex lens 7 is made thicker than the reference thickness "$t_0$" is improved, as represented in FIG. 10, as compared with a case where the thickness of this convex lens 7 is equal to the reference thickness "$t_0$" in such a range that the thickness increasing amount is smaller than, or equal to 40% of the above-explained radius of curvature "r".

Figure 11:
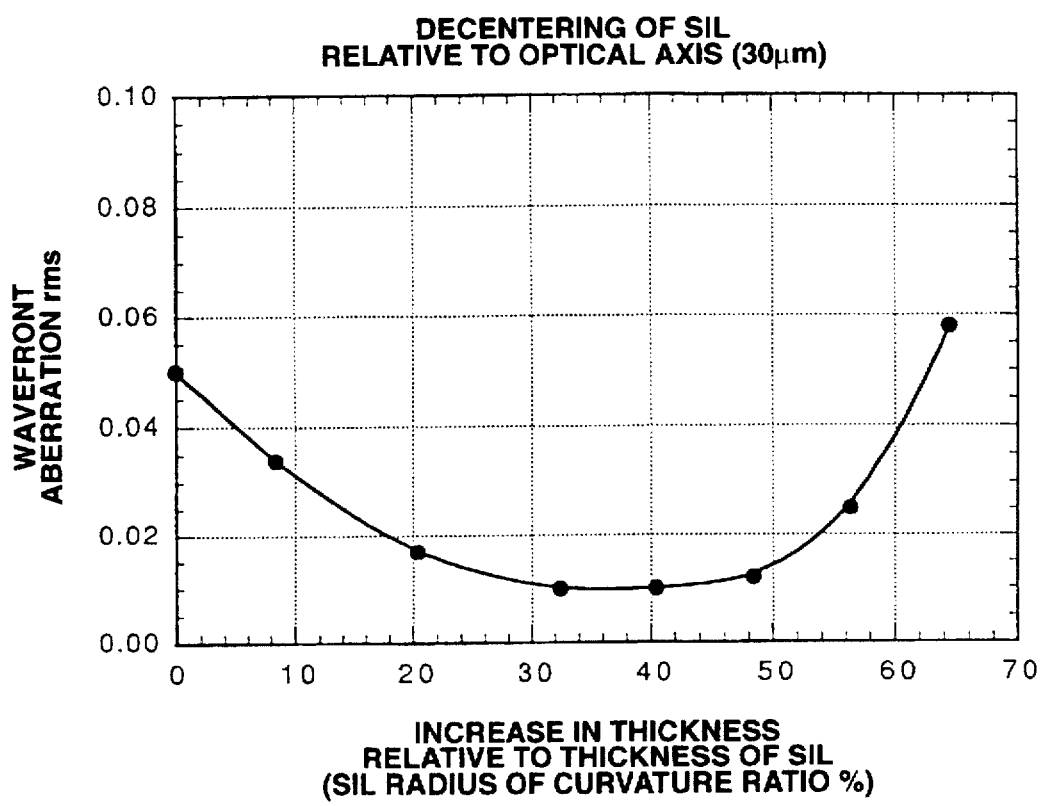
FIG. 11 is a graph showing an amount of wavefront aberration caused by decentering (30 μm) of the convex lens (solid immersion lens) with respect to the optical axis in comparison with the increase in the thickness of the convex lens (solid immersion lens) in the optical pickup apparatus.

Furthermore, as for the decentering (30 μm) of the convex lens 7 with respect to the optical axis, a change in the wavefront aberration (rms ($\lambda$)) when the thickness of the convex lens 7 is made thicker than the reference thickness "$t_0$" is improved, as represented in FIG. 11, as compared with such a case that the thickness of this convex lens 7 is equal to the reference thickness "$t_0$" in such a range that the thickness increasing amount is smaller than, or equal to 60% of the above-explained radius of curvature "r".

Figure 12:
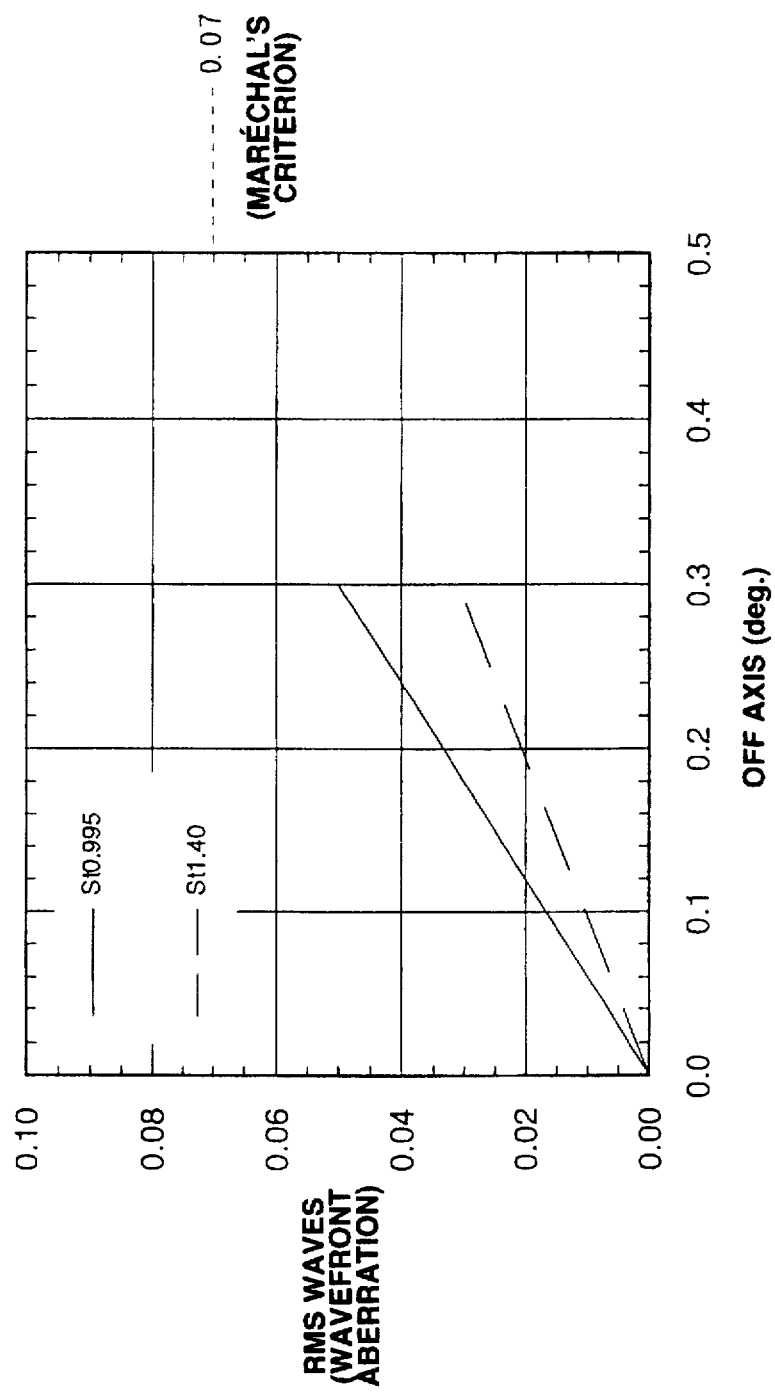
FIG. 12 is a graph indicating an amount of wavefront aberration occurred in the optical pickup apparatus in comparison with the angle of off-axis incidence.

Then, as for such a case that the angle of off-axis incidence is changed, a change in the wavefront aberration (rms ($\lambda$)) when the thickness (t=1.4 mm) of the convex lens 7 is made thicker than the reference thickness $t_0$ ($t_0$=0.995 mm) by 32.4% of the radius of curvature "r" is improved, as shown in FIG. 12, as compared with such a case that the thickness of this convex lens 7 is equal to the reference thickness "$t_0$".

Figure 13:
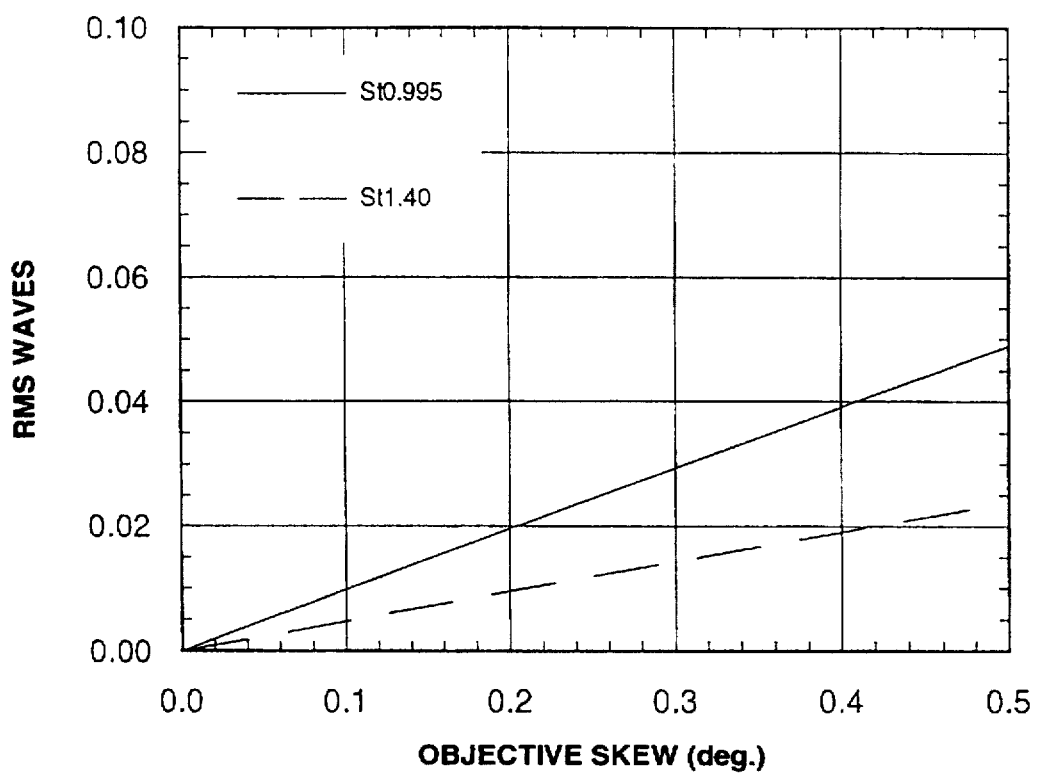
FIG. 13 is a graph indicating an amount of wavefront aberration which occurred in the optical pickup apparatus in comparison with the objective skew with respect to the optical axis.

Also, as to such a case that the objective skew of the objective lens 6 with respect to the optical axis is changed, a change in the wavefront aberration (rms ($\lambda$)) when the thickness (t=1.4 mm) of the convex lens 7 is made thicker than the reference thickness $t_0$ ($t_0$=0.995 mm) by 32.4% of the radius of curvature "r" is improved, as shown in FIG. 13, as compared with such a case that the thickness of this convex lens 7 is equal to the reference thickness "$t_0$".

Figure 14:
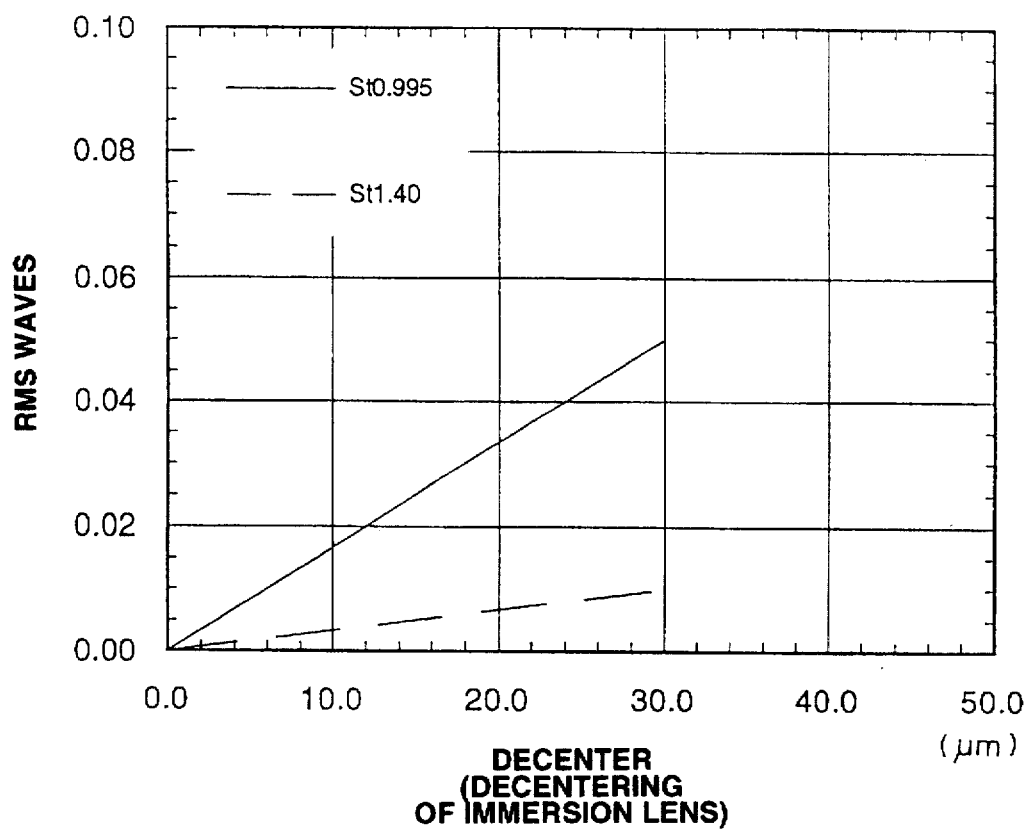
FIG. 14 is a graph indicating an amount of wavefront aberration which occurred in the optical pickup apparatus in comparison with the decentering of the convex lens (solid immersion lens) with respect to the optical axis.

Furthermore, as for such a case that the decentering amount of the convex lens 7 is changed with respect to the optical axis, a change in the wavefront aberration (rms ($\lambda$)) when the thickness (t=1.4 mm) of the convex lens 7 is made thicker than the reference thickness $t_0$ ($t_0$=0.995 mm) by 32.4% of the radius of curvature "r" is improved, as shown in FIG. 14, as compared with such a case that the thickness of this convex lens 7 is equal to the reference thickness "$t_0$".

Figure 8:
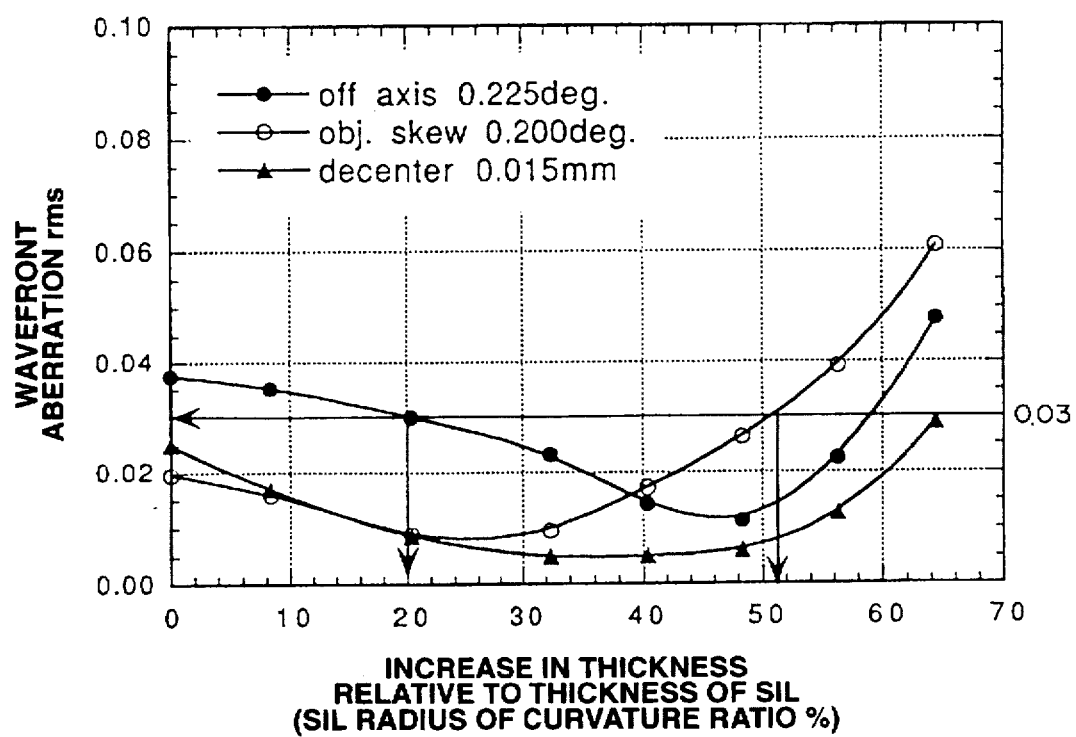
FIG. 8 is a graph showing that an amount of wavefront aberration caused by the objective skew and off-axis incidence, and also the decentering of the convex lens (solid immersion lens) with respect to the optical axis, in comparison with an increase in the thickness of the convex lens (solid immersion lens) in the optical pickup apparatus.

Then, assuming now that the off-axis incidence is selected to be 0.225°, the angle of the objective skew of the objective lens 6 with respect to the optical axis is selected to be 0.200°, and the decentering amount of the convex lens 7 with respect to the optical axis is selected to be 15 μm, as for the change in the wavefront aberration (rms ($\lambda$)) when the thickness of the convex lens 7 is made thicker than the reference thickness "$t_0$", as illustrated in FIG. 8, such aberration can be entirely suppressed which is produced by combining the off-axis incidence, the objective skew of the objective lens 6 with respect to the optical axis, with the decentering of the convex lens 7 with respect to the optical axis in such a range that the increase in thickness is 20% to 50% of the radius of curvature "r".

It should be noted that the optimum thickness increasing amount of the convex lens 7 from the reference thickness "$t_0$" is equal to 32% to 33% of the radius of curvature "r".

Figures 34, 35, 36:
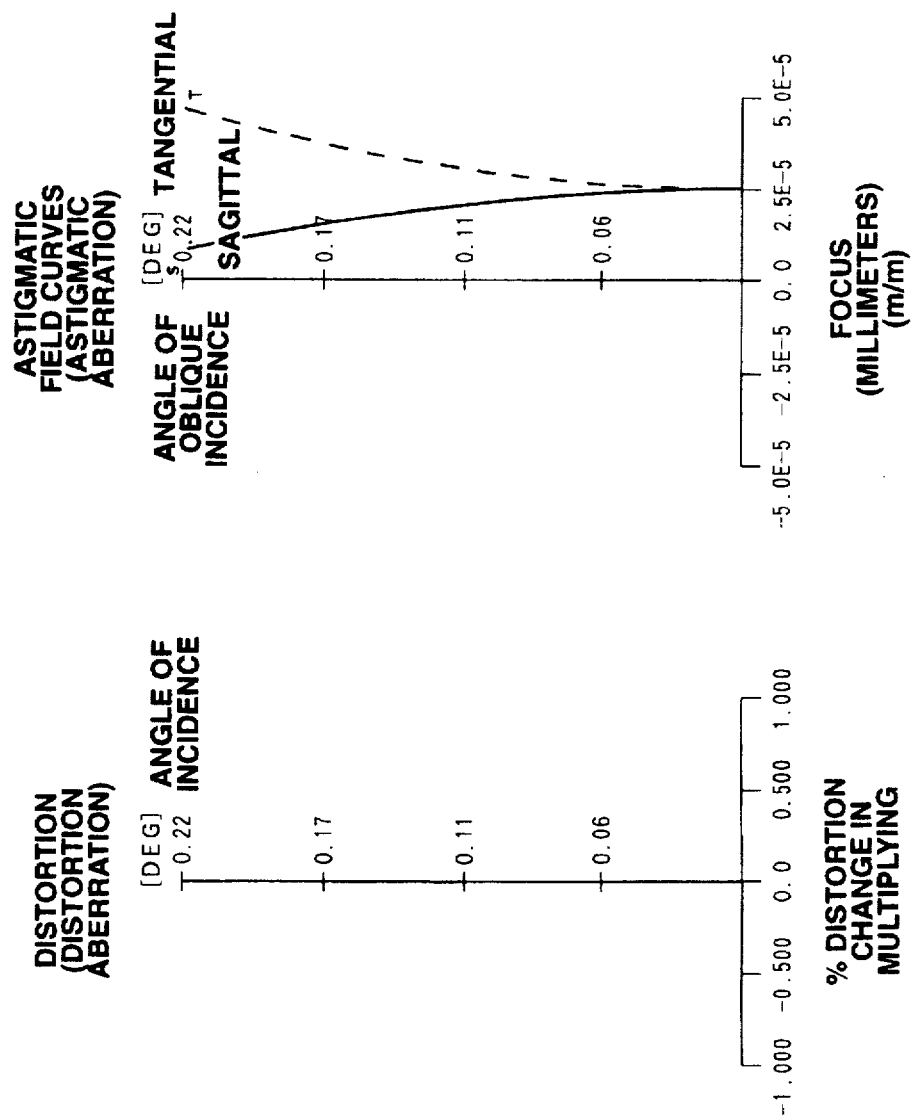
FIG. 34 is a graph showing an amount of distortion aberration caused by the off-axis incidence in the conventional optical pickup apparatus having the convex lens (solid immersion lens)
FIG. 35 is a graph showing an amount of astigmatic aberration caused by the off-axis incidence in the conventional optical pickup apparatus.
FIG. 36 is a graph showing an amount of spherical aberration caused by the off-axis incidence in the conventional optical pickup apparatus.
Figure 37:
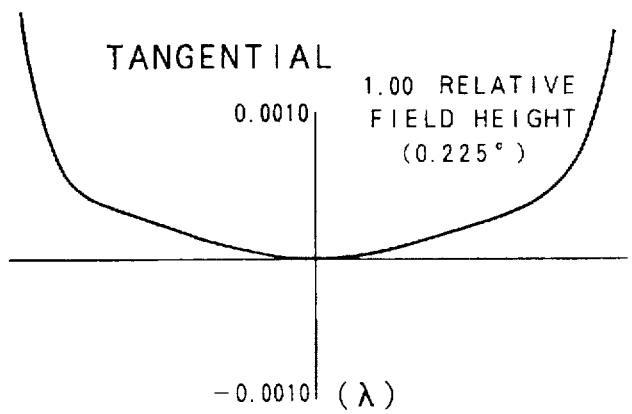
FIG. 37 is a graph showing an amount of comma aberration along the tangential direction caused by the off-axis incidence in the conventional optical pickup apparatus.
Figure 38:
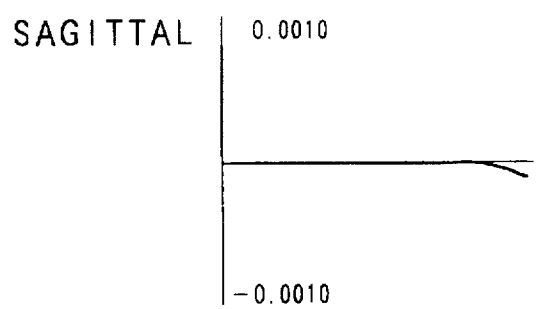
FIG. 38 is a graph showing an amount of comma aberration along the sagittal direction caused by the off-axis incidence in the conventional optical pickup apparatus.
Figure 39:
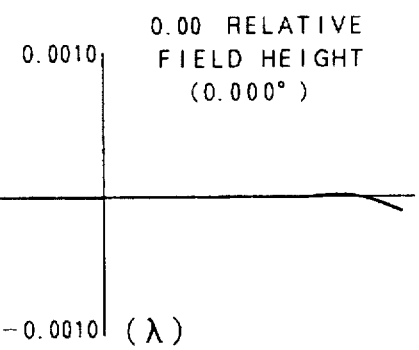
FIG. 39 is a graph showing an amount of comma aberration along the tangential direction occurred by the off-axis incidence in the conventional optical pickup apparatus.
Figure 40:
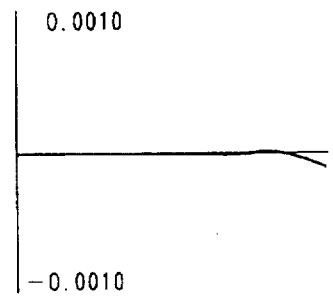
FIG. 40 is a graph showing an amount of comma aberration along the sagittal direction caused by the off-axis incidence in the conventional optical pickup apparatus.

Next, as for the off-axis incidence (0.225°), the spherical aberration when the thickness of the convex lens 7 is made thicker than the reference thickness "$t_0$" by 32.4% of the radius of curvature "r" is improved, as represented in FIG. 17, in comparison with the spherical aberration when the thickness of the convex lens 7 shown in FIG. 36 is equal to the reference thickness "$t_0$".

Then, as for the off-axis incidence (0.225°), the astigmatic aberration when the thickness of the convex lens 7 is made thicker than the reference thickness "$t_0$" by 32.4% of the radius of curvature "r" is improved, as represented in FIG. 16, in comparison with the astigmatic aberration when the thickness of the convex lens 7 shown in FIG. 35 is equal to the reference thickness "$t_0$".

Next, as for the off-axis incidence (0.225°), the distortion aberration when the thickness of the convex lens 7 is made thicker than the reference thickness "$t_0$" by 32.4% of the radius of curvature "r" does not occur, as represented in FIG. 15, in combination with the distortion aberration when the thickness of the convex lens 7 shown in FIG. 34 is equal to the reference thickness "$t_0$".

Figure 18:
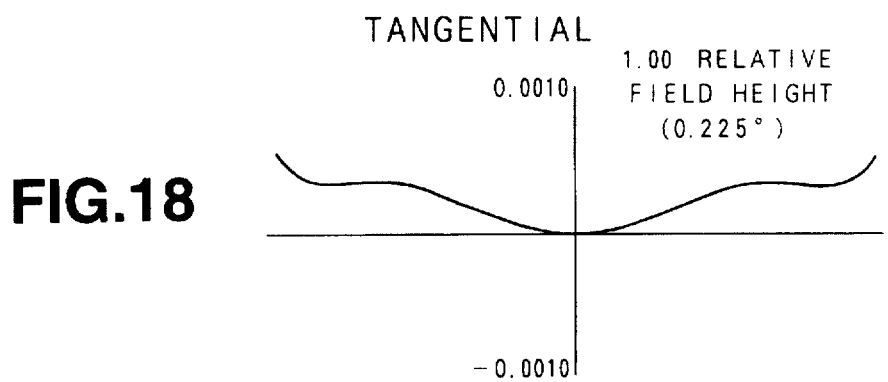
FIG. 18 is a graph indicating an amount of comma aberration along the tangential direction caused by the off-axis incidence in the optical pickup apparatus.
Figure 19:
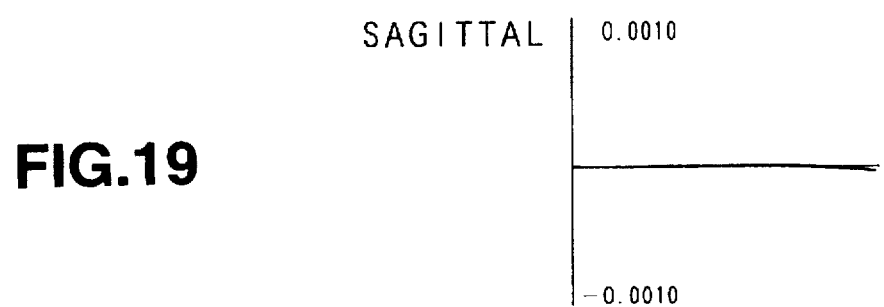
FIG. 19 is a graph representing an amount of comma aberration along the sagittal direction caused by the off-axis incidence in the optical pickup apparatus.
Figure 20:
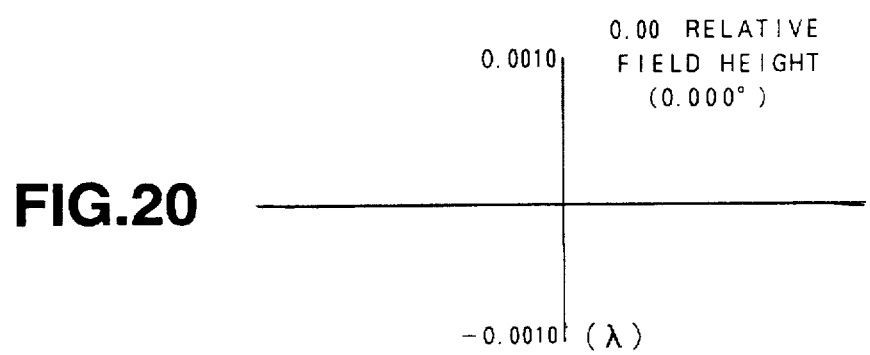
FIG. 20 is a graph indicating an amount of comma aberration along the tangential direction caused by the off-axis incidence in the optical pickup apparatus.
Figure 21:
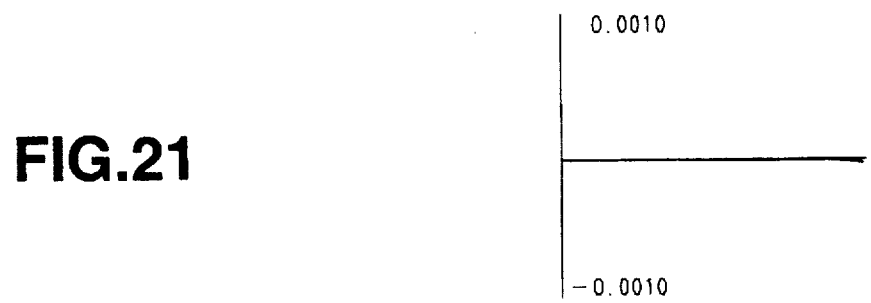
FIG. 21 is a graph representing an amount of comma aberration along the sagittal direction caused by the off-axis incidence in the optical pickup apparatus.

Also, as for the off-axis incidence (0.225°), the comma aberration when the thickness of the convex lens 7 is made thicker than the reference thickness "$t_0$" by 32.4% of the radius of curvature "r" is improved, as represented in FIG. 18 and FIG. 19, in comparison with the comma aberration when the thickness of the convex lens 7 shown in FIG. 37 to FIG. 40 is equal to the reference thickness "$t_0$", with respect to the tangential direction as well as the sagittal direction of the image height 1.00. Furthermore, the first-mentioned comma aberration is improved, as shown in FIG. 20 and FIG. 21, with respect to the tangential direction as well as the sagittal direction of the image height 0.00.

Figures 22, 23:
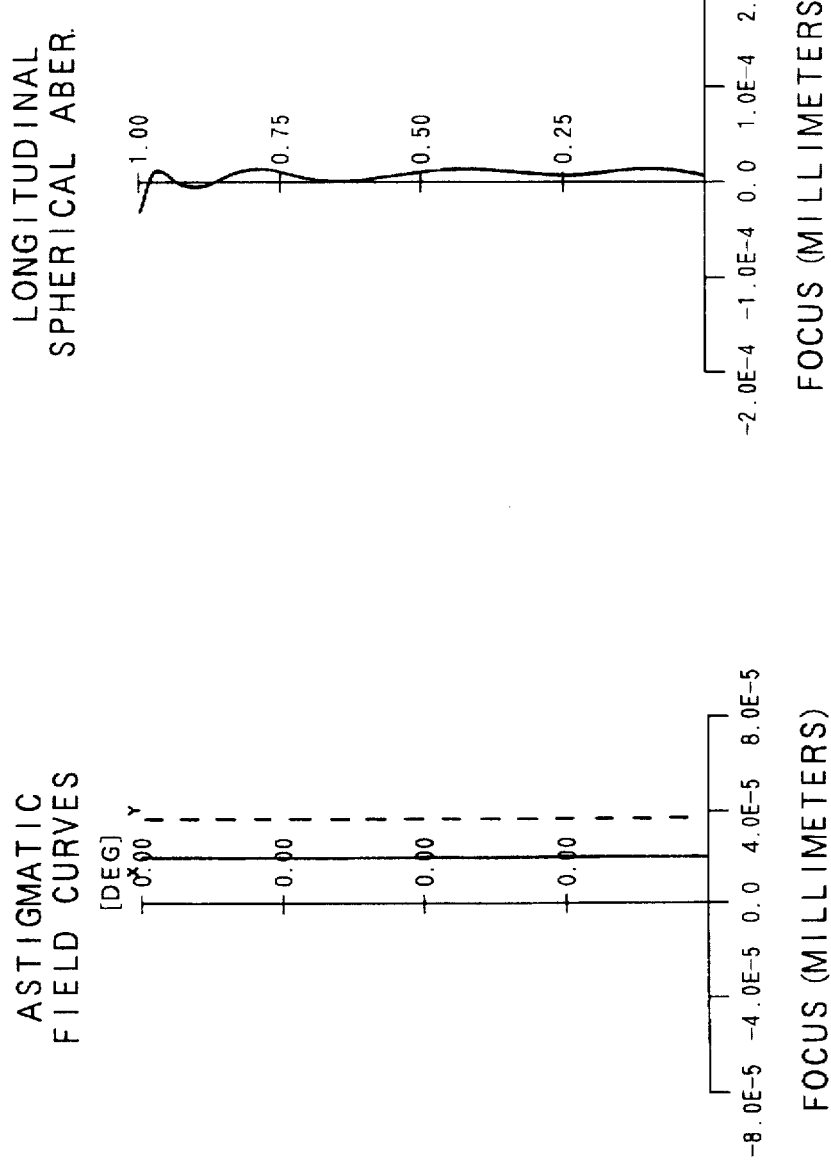
FIG. 22 is a graph showing an amount of astigmatic aberration caused by the objective skew with respect to the optical axis in the optical pickup apparatus.
FIG. 23 is a graph showing an amount of spherical aberration caused by the objective skew with respect to the optical axis in the optical pickup apparatus.
Figures 41, 42:
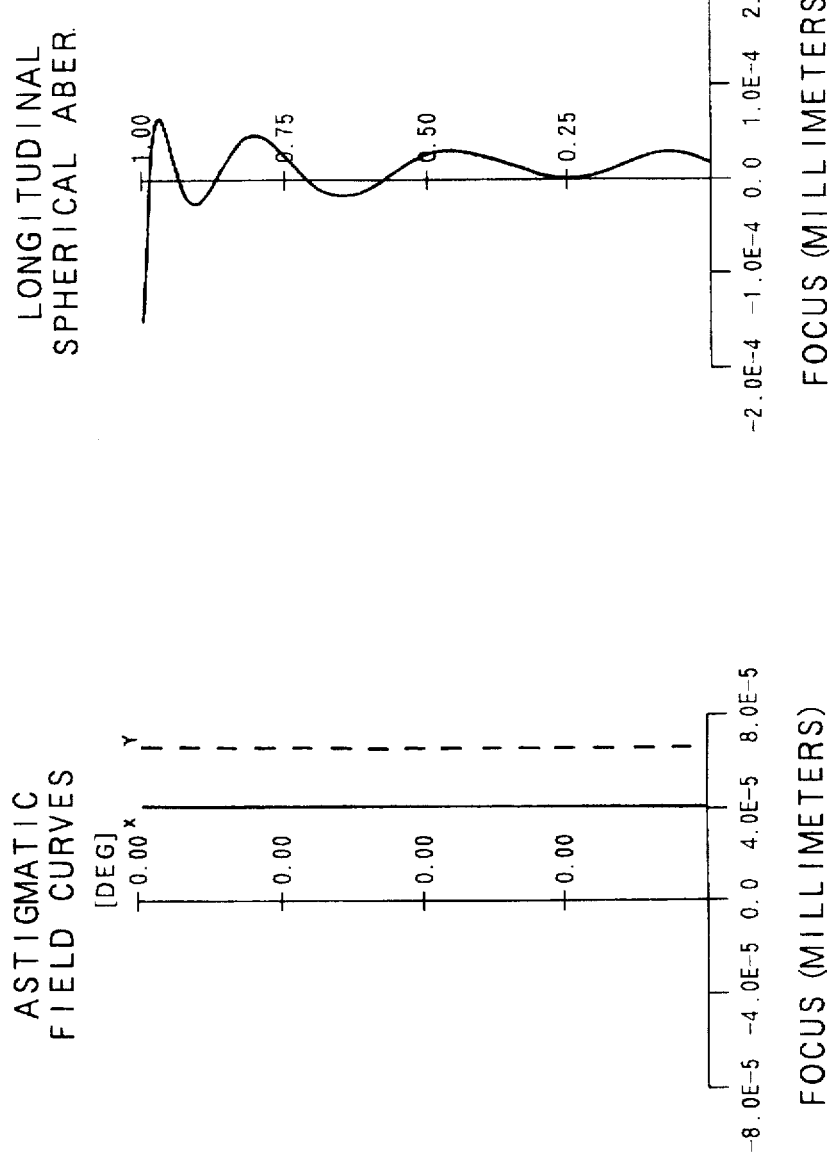
FIG. 41 is a graph showing an amount of astigmatic aberration caused by the objective skew with respect to the optical axis in the conventional optical pickup apparatus.
FIG. 42 is a graph showing an amount of spherical aberration caused by the objective skew with respect to the conventional optical pickup apparatus.
Figure 43:
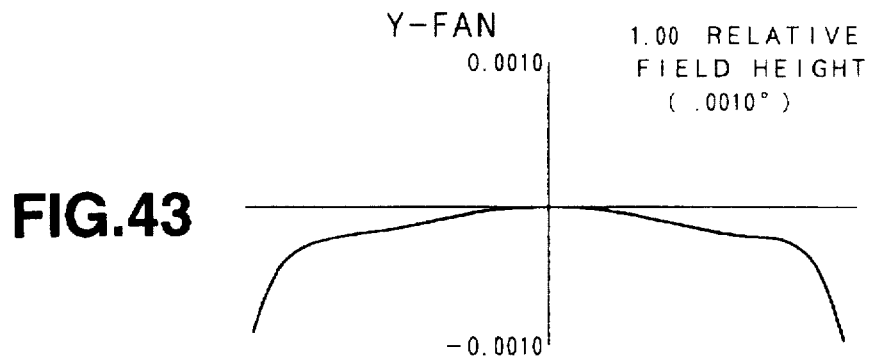
FIG. 43 is a graph showing an amount of comma aberration along the tangential direction caused by the objective skew with respect to the optical axis in the conventional optical pickup apparatus.
Figure 44:
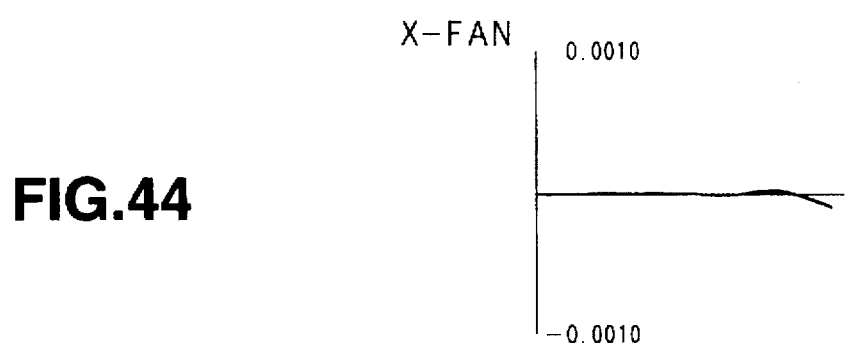
FIG. 44 is a graph showing an amount of comma aberration along the sagittal direction caused by the objective skew with respect to the optical axis in the conventional optical pickup apparatus.
Figure 45:
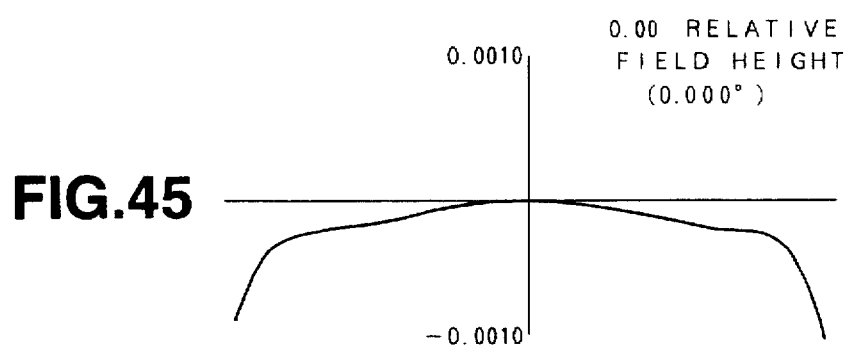
FIG. 45 is a graph showing an amount of comma aberration along the tangential direction caused by the objective skew with respect to the optical axis in the conventional optical pickup apparatus.
Figure 46:
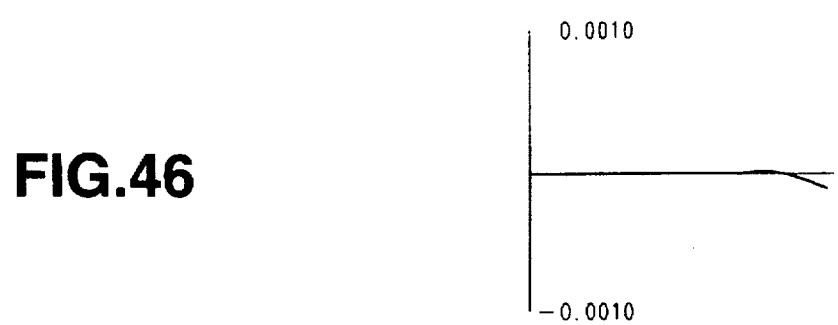
FIG. 46 is a graph showing an amount of comma aberration along the sagittal direction caused by the objective skew with respect to the optical axis in the conventional optical pickup apparatus.

Then, as for the objective skew of the objective lens 6 with respect to the optical axis (0.2°), the spherical aberration when the thickness of the convex lens 7 is made thicker than the reference thickness "$t_0$" by 32.4% of the radius of curvature "r" is improved, as represented in FIG. 23, in comparison with the spherical aberration when the thickness of the convex lens 7 shown in FIG. 42 is equal to the reference thickness "$t_0$".

Also, as for the objective skew of the objective lens 6 with respect to the optical axis (0.2°), the astigmatic aberration when the thickness of the convex lens 7 is made thicker than the reference thickness "$t_0$" by 32.4% of the radius of curvature "r" is improved, as represented in FIG. 22, in comparison with the astigmatic aberration when the thickness of the convex lens 7 shown in FIG. 41 is equal to the reference thickness "$t_0$".

Figure 24:
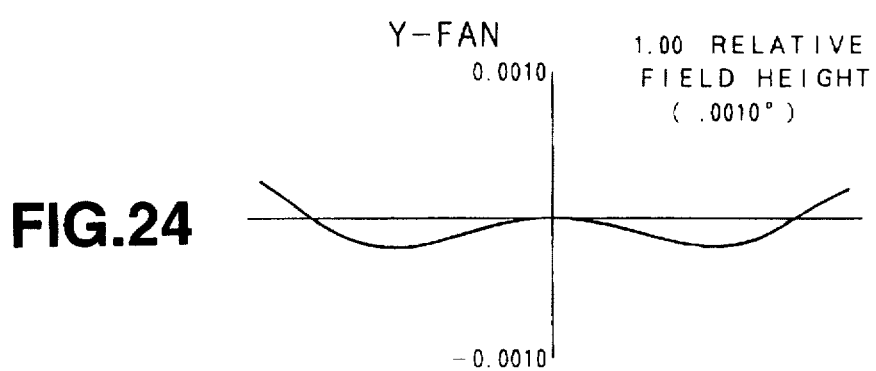
FIG. 24 is a graph showing an amount of comma aberration along the tangential direction caused by the objective skew with respect to the optical axis in the optical pickup apparatus.
Figure 25:
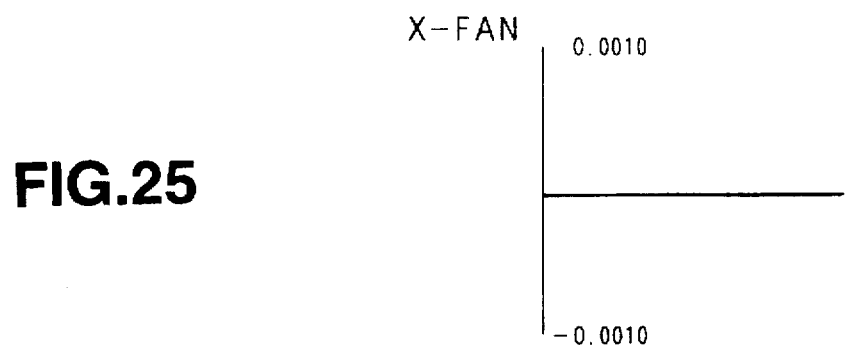
FIG. 25 is a graph showing an amount of comma aberration along the sagittal direction caused by the objective skew with respect to the optical axis in the optical pickup apparatus.
Figure 26:
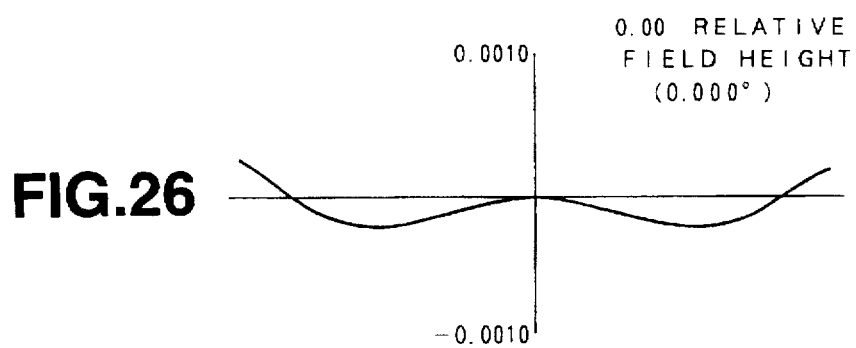
FIG. 26 is a graph showing an amount of comma aberration along the tangential direction caused by the objective skew with respect to the optical axis in the optical pickup apparatus.
Figure 27:
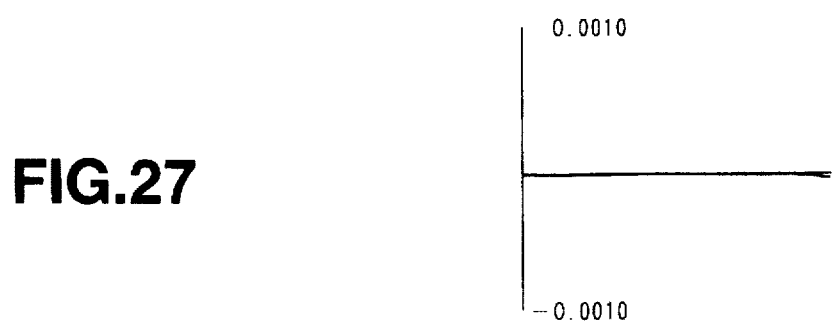
FIG. 27 is a graph showing an amount of comma aberration along the sagittal direction caused by the objective skew with respect to the optical axis in the optical pickup apparatus.

Further, as for the objective skew of the objective lens 6 with respect to the optical axis (0.2°), the comma aberration when the thickness of the convex lens 7 is made thicker than the reference thickness "$t_0$" by 32.4% of the radius of curvature "r" is improved, as represented in FIG. 24 and FIG. 25, in comparison with the comma aberration when the thickness of the convex lens 7 shown in FIG. 43 to FIG. 46 is equal to the reference thickness "$t_0$", with respect to the tangential (Y) direction as well as the sagittal (X) direction of the image height 1.00. Also, the first-mentioned comma aberration is improved, as represented in FIG. 26 and FIG. 27, with respect to the tangential (Y) direction as well as the sagittal (X) direction of the image height 0.00.

Figures 47, 48:
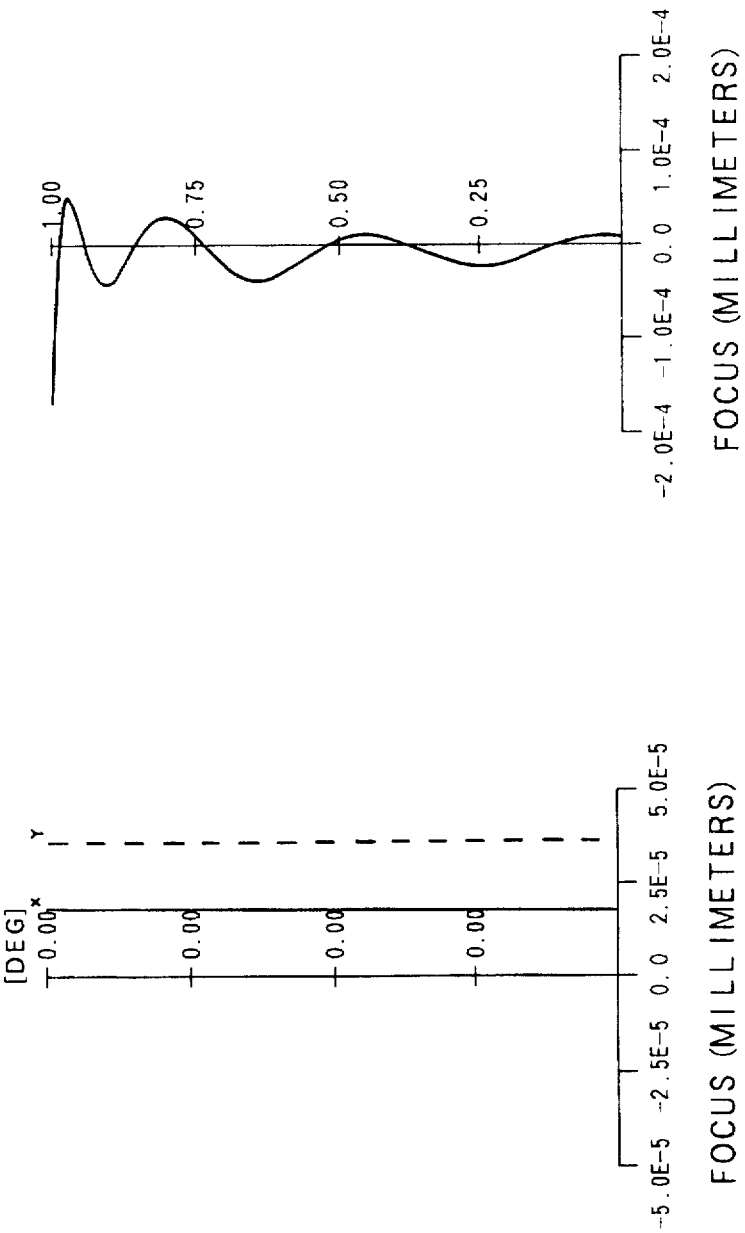
FIG. 47 is a graph indicating an amount of astigmatic aberration caused by the decentering of the convex lens (solid immersion lens) with respect to the optical axis in the conventional optical pickup apparatus.
FIG. 48 is a graph indicating an amount of spherical aberration caused by the decentering of the convex lens (solid immersion lens) with respect to the optical axis in the conventional optical pickup apparatus.
Figure 49:
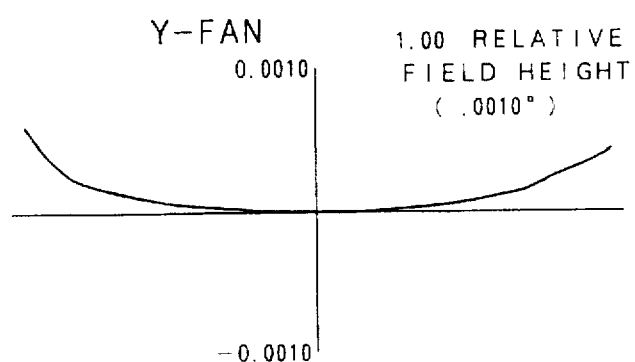
FIG. 49 is a graph indicating an amount of comma aberration along the tangential direction caused by the decentering of the convex lens (solid immersion lens) with respect to the optical axis in the conventional optical pickup apparatus.
Figure 50:
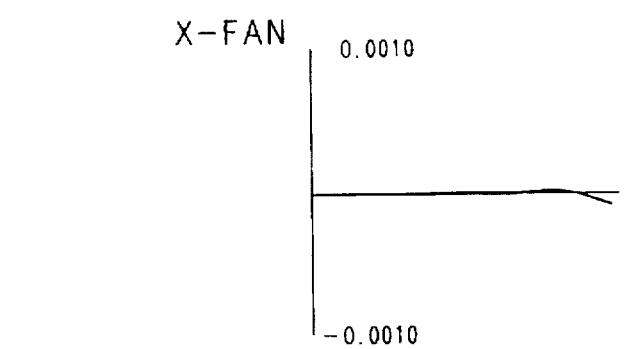
FIG. 50 is a graph indicating an amount of comma aberration along the sagittal direction caused by the decentering of the convex lens (solid immersion lens) with respect to the optical axis in the conventional optical pickup apparatus.
Figure 51:
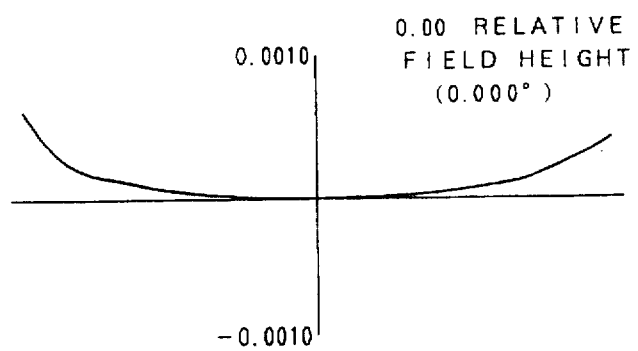
FIG. 51 is a graph indicating an amount of comma aberration along the tangential direction caused by the decentering of the convex lens (solid immersion lens) with respect to the optical axis in the conventional optical pickup apparatus.
Figure 52:
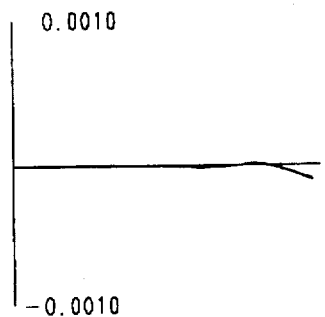
FIG. 52 is a graph indicating an amount of comma aberration along the sagittal direction caused by the decentering of the convex lens (solid immersion lens) with respect to the optical axis in the conventional optical pickup apparatus.

Then, as for the decentering amount (30 μm) of the convex lens 7 with respect to the optical axis, the spherical aberration when the thickness of the convex lens 7 is made thicker than the reference thickness "$t_0$" by 32.4% of the radius of curvature "r" is improved, as represented in FIG. 29, in comparison with the spherical aberration when the thickness of the convex lens 7 shown in FIG. 48 is equal to the reference thickness "$t_0$".

Also, as for the decentering amount (30 μm) of the convex lens 7 with respect to the optical axis, the astigmatic aberration when the thickness of the convex lens 7 is made thicker than the reference thickness "$t_0$" by 32.4% of the radius of curvature "r" is improved, as represented in FIG. 28, in comparison with the astigmatic aberration when the thickness of the convex lens 7 shown in FIG. 47 is equal to the reference thickness "$t_0$".

Figure 30:
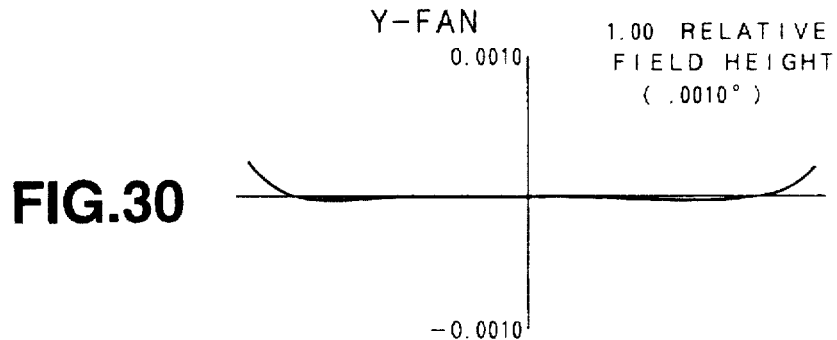
FIG. 30 is a graph indicating an amount of comma aberration along the tangential direction caused by the decentering of the convex lens (solid immersion lens) with respect to the optical axis in the optical pickup apparatus.
Figure 31:
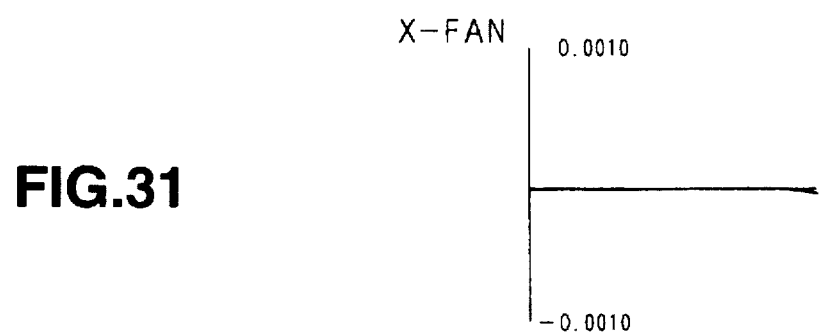
FIG. 31 is a graph indicating an amount of comma aberration along the sagittal direction caused by the decentering of the convex lens (solid immersion lens) with respect to the optical axis in the optical pickup apparatus.
Figure 32:
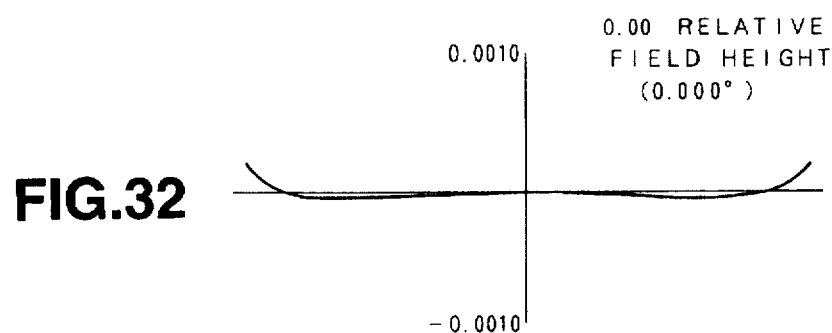
FIG. 32 is a graph indicating an amount of comma aberration along the tangential direction occurred by the decentering of the convex lens (solid immersion lens) with respect to the optical axis in the optical pickup apparatus.
Figure 33:
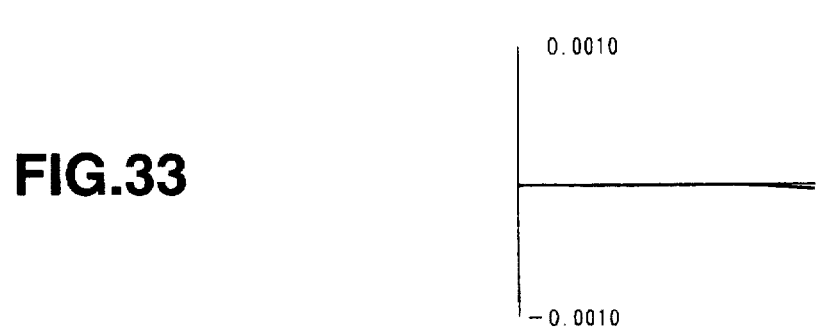
FIG. 33 is a graph indicating an amount of comma aberration along the sagittal direction caused by the decentering of the convex lens (solid immersion lens) with respect to the optical axis in the optical pickup apparatus.

Moreover, as for the decentering amount (30 μm) of the convex lens 7 with respect to the optical axis, the comma aberration when the thickness of the convex lens 7 is made thicker than the reference thickness "$t_0$" by 32.4% of the radius of curvature "r" is improved, as represented in FIG. 30 and FIG. 31, in comparison with the comma aberration when the thickness of the convex lens 7 shown in FIG. 49 to FIG. 52 is equal to the reference thickness "$t_0$", with respect to the tangential (Y) direction as well as the sagittal (X) direction of the image height 1.00. Also, the first-mentioned comma aberration is improved, as shown in FIG. 32 and FIG. 33, with respect to the tangential (Y) direction and the sagittal (X) direction of the image height 0.001.

It should be noted that the convex lens 7 may be transported in conjunction with the objective lens 6 by the same drive mechanism in the optical pickup apparatus according to the present invention.

What is claimed is:

1. An optical pickup apparatus wherein a light beam emitted from a light source is condensed onto a signal recording surface of an optical recording medium to thereby record or reproduce an information signal, comprising:

a light source for emitting a light beam;

an objective lens for condensing the light beam emitted from the light source toward an optical recording medium; and a convex lens arranged between said optical recording medium and said objective lens which has a first surface upon which the light from the objective lens is incident which is a convex spherical surface having a radius of curvature, and a second planar surface which is located opposite to a surface portion of said optical recording medium; wherein:

said convex lens has a thickness which is greater than a reference thickness, said reference thickness being a thickness at which light projected from said object lens is incident upon said convex spherical surface along an optical axis of said convex lens and is condensed through said convex lens onto the signal recording surface of the optical recording medium.

2. An optical pickup apparatus as claimed in claim 1, wherein said thickness of said convex lens is greater than said reference thickness by an amount smaller than, or equal to 60% of the radius of curvature of said convex spherical surface.

3. An optical pickup apparatus as claimed in claim 1, further comprising:

a detection means for detecting a position of said objective lens with respect to said optical recording medium; and a transport means for changing a position of said objective lens in response to an output signal from said detection means.

4. An optical pickup apparatus as claimed in claim 1, further comprising:

a detection means for detecting a position of said convex lens with respect to said optical recording medium; and a transport means for changing a position of said convex lens in response to an output signal from said detection means.

5. An optical pickup apparatus as claimed in claim 1, further comprising:

a first detection means for detecting a position of said objective lens;

a second detection means; for detecting a position of said convex lens;

a third detection means for detecting a position of the signal recording surface of said recording medium;

a first transport means for changing a position of said objective lens in response to an output signal from said first detection means; and a second transport means for changing a position of said convex lens in response to an output signal from said second detection means.

6. An optical pickup apparatus as claimed in claim 1 wherein:

both said objective lens and said convex lens are transported in an integral manner by a common transport means.

7. An optical pickup apparatus wherein a light beam emitted from an light source is condensed onto a signal recording surface of an optical recording medium to thereby record or reproduce an information signal, comprising:

a light source for emitting a light beam;

an objective lens for condensing the light beam emitted from the light source toward an optical recording medium; and a convex lens arranged between said optical recording medium and said objective lens which has a first surface upon which the light from the objective lens is incident which is a convex spherical surface having a radius of curvature, and a second planar surface which is located opposite to a surface portion of said optical recording medium; wherein:

said convex lens has a thickness which is greater than a reference thickness, said reference thickness being a thickness at which light projected from said object lens is incident upon said convex spherical surface along an optical axis of said convex lens and is condensed through said convex lens onto the signal recording surface of the optical recording medium, wherein said thickness of said convex lens is greater than said reference thickness by an amount equal to 20% to 50% of the radius of curvature of said convex spherical surface.

8. An optical pickup apparatus as claimed in claim 7, further comprising:

a detection means for detecting a position of said objective lens with respect to said optical recording medium; and a transport means for changing a position of said objective lens in response to an output signal from said detection means.

9. An optical pickup apparatus as claimed in claim 7, further comprising:

a detection means for detecting a position of said convex lens with respect to said optical recording medium; and a transport means for changing a position of said convex lens in response to an output signal from said detection means.

10. An optical pickup apparatus as claimed in claim 7, further comprising:

a first detection means for detecting a position of said objective lens;

a second detection means; for detecting a position of said convex lens;

a third detection means for detecting a position of the signal recording surface of said recording medium;

a first transport means for changing a position of said objective lens in response to an output signal from said first detection means; and a second transport means for changing a position of said convex lens in response to an output signal from said second detection means.

11. An optical pickup apparatus as claimed in claim 7 wherein:

both said objective lens and said convex lens are transported in an integral manner by a common transport means.

* * * * *